United States Patent
Chen et al.

(10) Patent No.: US 11,939,417 B2
(45) Date of Patent: *Mar. 26, 2024

(54) ZIEGLER-NATTA CATALYST WITH AN ELECTRON DONOR COMPOUND FOR INCREASING POLYMER MOLECULAR WEIGHT

(71) Applicant: Dow Global Technologies LLC, Midland, MI (US)

(72) Inventors: Linfeng Chen, Missouri City, TX (US); Mingzhe Yu, Midland, MI (US); Mehmet Demirors, Pearland, TX (US); Andrew T. Heitsch, Angleton, TX (US); Jeffrey A. Sims, Lake Jackson, TX (US); David Gordon Barton, Midland, MI (US); Kurt F. Hirsekorn, Sugar Land, TX (US); Peter N. Nickias, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 574 days.

This patent is subject to a terminal disclaimer.

(21) Appl. No.: 17/056,473

(22) PCT Filed: May 29, 2019

(86) PCT No.: PCT/US2019/034299
§ 371 (c)(1),
(2) Date: Nov. 18, 2020

(87) PCT Pub. No.: WO2019/231986
PCT Pub. Date: Dec. 5, 2019

(65) Prior Publication Data
US 2021/0221924 A1 Jul. 22, 2021

Related U.S. Application Data

(60) Provisional application No. 62/679,263, filed on Jun. 1, 2018.

(51) Int. Cl.
*C08F 4/655* (2006.01)
*C08F 2/06* (2006.01)
*C08F 4/685* (2006.01)
*C08F 10/02* (2006.01)

(52) U.S. Cl.
CPC ............. *C08F 4/6557* (2013.01); *C08F 2/06* (2013.01); *C08F 4/685* (2013.01); *C08F 10/02* (2013.01)

(58) Field of Classification Search
USPC ............... 502/118, 134; 526/116, 119, 124.4
See application file for complete search history.

(56) References Cited

U.S. PATENT DOCUMENTS

| | | | |
|---|---|---|---|
| 4,097,409 A | 6/1978 | Speakman | |
| 4,120,820 A | 10/1978 | Birkelbach | |
| 4,224,186 A | 9/1980 | Lowery et al. | |
| 4,308,369 A | 12/1981 | Shipley et al. | |
| 4,380,508 A | 4/1983 | Shipley et al. | |
| 4,399,054 A * | 8/1983 | Ferraris ................... | C08F 10/00 526/124.8 |
| 4,617,284 A * | 10/1986 | Matsuura ................ | C08F 10/00 526/125.1 |
| 4,661,465 A | 4/1987 | Fuentes et al. | |
| 5,045,612 A | 9/1991 | Schell, Jr. et al. | |
| 5,114,897 A | 5/1992 | Schell, Jr. et al. | |
| 5,212,133 A | 5/1993 | Duranel et al. | |
| 5,747,407 A | 5/1998 | Martin | |
| 9,688,795 B2 | 6/2017 | Cerk et al. | |

(Continued)

FOREIGN PATENT DOCUMENTS

| | | |
|---|---|---|
| CN | 102388070 A | 3/2012 |
| GB | 1292853 A | 10/1972 |

(Continued)

OTHER PUBLICATIONS

Brazilian Office Action issued for related Brazil Application No. BR112020024089-3 dated Dec. 21, 2022 (6 total pages).
Chinese Search Report issued for related Chinese Application No. 201980040682.X dated Nov. 22, 2022 (2 total pages).
Chinese Office Action issued for related Chinese Application No. 201980040682.X dated Nov. 28, 2022 (11 total pages).
International Search Report and Written Opinion pertaining to PCT/US2019/034299, dated Sep. 18, 2019.
Williams et al., "The Construction of a Polyethylene Calibration Curve for Gel Permeation Chromatography using Polystyrene Fractions", Polymer Letters, 1968, 621-624.

(Continued)

*Primary Examiner* — Fred M Teskin
(74) *Attorney, Agent, or Firm* — Dinsmore & Shohl LLP

(57) ABSTRACT

A heterogeneous procatalyst includes a preformed heterogeneous procatalyst and a metal-ligand complex. The preformed heterogeneous procatalyst includes a titanium species and a magnesium chloride ($MgCl_2$) support. The metal-ligand complex has a structural formula $(L)_a M(Y)_m (XR^2)_b$, where M is a metal cation; each L is a neutral ligand or (=O); each Y is a halide or ($C_1$-$C_{20}$)alkyl; each $XR^2$ is an anionic ligand in which X is a heteroatom or a heteroatom-containing functional group and $R^2$ is ($C_1$-$C_{20}$)hydrocarbyl or ($C_1$-$C_{20}$) heterohydrocarbyl; n is 0, 1, or 2; m is 0-4; and b is 1-6. The metal-ligand complex is overall charge neutral. The heterogeneous procatalyst exhibits improved average molecular weight capability. A catalyst system includes the heterogeneous procatalyst and a cocatalyst. Processes for producing the heterogeneous procatalyst and processes for producing ethylene-based polymers utilizing the heterogeneous procatalyst are also disclosed.

17 Claims, No Drawings

(56) References Cited

U.S. PATENT DOCUMENTS

| | | |
|---|---|---|
| 2014/0080970 A1 | 3/2014 | Desjardins et al. |
| 2016/0272732 A1 | 9/2016 | Zhang et al. |
| 2019/0256618 A1 | 8/2019 | Chen et al. |
| 2019/0322774 A1 | 10/2019 | Chen et al. |
| 2021/0205785 A1* | 7/2021 | Yu .......................... B01J 20/046 |

FOREIGN PATENT DOCUMENTS

| | | |
|---|---|---|
| WO | 2017040127 A1 | 3/2017 |
| WO | 2018011086 A1 | 1/2018 |
| WO | 2018060116 A1 | 4/2018 |
| WO | 2018063899 A1 | 4/2018 |

OTHER PUBLICATIONS

CN Second Office Action, dated Aug. 12, 2023, pertaining to Chinese Patent Application No. 201980040682.X, 11 pgs.
Brazil Office Action dated Nov. 6, 2023, pertaining to BR Patent Application No. BR112020024089-3, 8 pgs.
Chinese Office Action dated Dec. 16, 2023, pertaining to CN Patent Application No. 201980040682.X, 16 pgs.

\* cited by examiner

ZIEGLER-NATTA CATALYST WITH AN ELECTRON DONOR COMPOUND FOR INCREASING POLYMER MOLECULAR WEIGHT

CROSS-REFERENCE TO RELATED APPLICATIONS

This application is a National Stage Entry under 35 U.S.C. § 371 of International Patent Application No. PCT/US2019/034299, filed May 29, 2019, which claims priority to U.S. Provisional Application 62/679,263, filed Jun. 1, 2018, both of which are incorporated herein by reference in their entireties.

TECHNICAL FIELD

Embodiments of the present disclosure generally relate to Ziegler-Natta catalysts useful for olefin polymerizations. More specifically, embodiments of the present disclosure relate to Ziegler-Natta catalysts for producing ethylene-based polymers with increased molecular weight and high density fraction.

BACKGROUND

Polyethylene polymers are some of the most common plastics and may be used in a variety of ways depending on the structure of the polymer, for example, as bags/liners, caps/closures, hygiene films, industrial injection molding, etc. It has been estimated that approximately 80 million metric tons of ethylene-based polymer is produced each year. Because there is a need for significant and continued differentiation of polymer products in the polyethylene markets, researchers have devoted a great deal of effort to searching for process alterations that will yield such new products.

For many polyethylene polymers and copolymers, such as LLDPE for example, ethylene is generally copolymerized with a short-chain olefin comonomer (for example, 1-butene, 1-hexene and/or 1-octene). The resulting polyethylene polymer is substantially linear but includes significant numbers of short branches, and these characteristics give it a higher tensile strength, higher impact strength and higher puncture resistance than those of low density polyethylene (LDPE). These improved properties, in turn, mean that lower thickness (gauge) films can be made and the product exhibits improved environmental stress cracking resistance. LLDPE is used predominantly in film applications due to its toughness, flexibility and relative transparency. Product examples range from agricultural films, food protection wrap, and bubble wrap, to multilayer and composite films.

Ziegler-Natta catalysts have been used for many years in producing a variety of polyethylenes, including LLDPE. These catalysts generally include a magnesium halide support and at least one transition metal compound, typically a titanium species. Though effective, these catalysts are generally limited in their molecular weight capability, especially at high polymerization temperature. Additionally, it is difficult to adjust the composition of a polymer made by Ziegler-Natta catalyst.

SUMMARY

Accordingly, there is an ongoing need for processes, catalyst compositions, and methods for producing new, differentiated LLDPE polymers. In particular, there is an ongoing need for processes, catalyst compositions, and methods for producing ethylene-based polymers with increased weight average molecular weight (Mw), increased high density fraction (HDF), and/or reduced comonomer weight percent. The present disclosure is directed to heterogeneous procatalysts and catalyst systems and methods and processes utilizing these heterogeneous procatalysts and catalyst systems to produce ethylene-based polymers having increased Mw and HDF and decreased comonomer weight percent.

According to at least one embodiment, a heterogeneous procatalyst includes a titanium species, a preformed magnesium chloride ($MgCl_2$) support with a specific surface area of at least 100 $m^2/g$, and a chlorinating agent having a structural formula $Al(Cl)_x(R^1)_{3-x}$ or $Si(Cl)_y(R^1)_{4-y}$, where $R^1$ is a ($C_1$-$C_{30}$) hydrocarbyl; x is 1, 2, or 3; and y is 1, 2, 3, or 4. The heterogeneous procatalyst may also include a metal-ligand complex having a structural formula $(L)_nM(Y)_m(XR^2)_b$, where M is a metal cation; each L is a neutral ligand or (=O); each Y is a halide or ($C_1$-$C_{20}$)alkyl, each $XR^2$ is an anionic ligand in which X is a heteroatom or a heteroatom-containing functional group and $R^2$ is ($C_1$-$C_{20}$)hydrocarbyl or ($C_1$-$C_{20}$)heterohydrocarbyl; n is 0, 1, or 2; m is 0, 1, 2, 3, or 4; b is 1, 2, 3, 4, 5, or 6; and the metal-ligand complex is overall charge neutral.

According to at least another embodiment, A heterogeneous procatalyst may include a preformed heterogeneous procatalyst and a metal-ligand complex. The preformed heterogeneous procatalyst may include a titanium species and a $MgCl_2$ support. The metal-ligand complex may have a structural formula $(L)_nM(Y)_m(XR^2)_b$, where M is a metal cation; each L is a neutral ligand or (=O); each Y is a halide or ($C_1$-$C_{20}$)alkyl; each $XR^2$ is an anionic ligand in which X is a heteroatom or a heteroatom-containing functional group and $R^2$ is ($C_1$-$C_{20}$)hydrocarbyl or ($C_1$-$C_{20}$)heterohydrocarbyl; n is 0, 1, or 2; m is 0, 1, 2, 3, or 4; b is 1, 2, 3, 4, 5, or 6; and the metal-ligand complex is overall charge neutral. In some embodiments, a catalyst system for olefin polymerization may include the heterogeneous procatalyst and a cocatalyst that includes an organoaluminum compound.

According to still other embodiments, a catalyst system for olefin polymerization may include a preformed heterogeneous procatalyst, a metal-ligand complex, and a cocatalyst comprising an organoaluminum compound. The preformed heterogeneous procatalyst may include a titanium species and a $MgCl_2$ support. The metal-ligand complex may have a structural formula $(L)_nM(Y)_m(XR^2)_b$, where M is a metal cation; each L is a neutral ligand or (=O); each Y is a halide or ($C_1$-$C_{20}$)alkyl; each $XR^2$ is an anionic ligand in which X is a heteroatom or a heteroatom-containing functional group and $R^2$ is ($C_1$-$C_{20}$)hydrocarbyl or ($C_1$-$C_{20}$) heterohydrocarbyl; n is 0, 1, or 2; m is 0, 1, 2, 3, or 4; b is 1, 2, 3, 4, 5, or 6; and the metal-ligand complex is overall charge neutral.

According to still other embodiments, a process for preparing a heterogeneous procatalyst may include contacting a magnesium chloride component with a chlorinating agent, a titanium species, and a metal-ligand complex. The magnesium chloride component may be a preformed $MgCl_2$ support with specific surface area of at least 100 $m^2/g$. The chlorinating agent may have a structural formula $Al(Cl)_x(R^1)_{3-x}$ or $Si(Cl)_y(R^1)_{4-y}$, where $R^1$ is a ($C_1$-$C_{30}$) hydrocarbyl; x is 1, 2, or 3; and y is 1, 2, 3, or 4. The metal-ligand complex may have a structural formula $(L)_nM(Y)_m(XR^2)_b$, where M is a metal cation; each L is a neutral ligand or (=O); each Y is a halide or ($C_1$-$C_{20}$)alkyl; each $XR^2$ is an anionic ligand in which X is a heteroatom or a heteroatom-containing functional group and $R^2$ is $(C_1-C_{20})$hydrocarbyl or $(C_1-C_{20})$heterohydrocarbyl; n is 0, 1, or 2; m is 0, 1, 2, 3, or 4; b is 1, 2, 3, 4, 5, or 6; and the metal-ligand complex is overall charge neutral.

According to still other embodiments, a process of preparing a heterogeneous procatalyst may include contacting components (1) and (2) without further chlorination. Component (1) may be a preformed heterogeneous procatalyst that includes a titanium species and a $MgCl_2$ support. Component (2) may be a metal-ligand complex having a structural formula $(L)_nM(Y)_m(XR^2)_b$, where M is a metal cation; each L is a neutral ligand or (=O); each Y is a halide or $(C_1-C_{20})$alkyl; each $XR^2$ is an anionic ligand in which X is a heteroatom or a heteroatom-containing functional group and $R^2$ is $(C_1-C_{20})$hydrocarbyl or $(C_1-C_{20})$heterohydrocarbyl; n is 0, 1, or 2; m is 0, 1, 2, 3, or 4; b is 1, 2, 3, 4, 5, or 6; and the metal-ligand complex is overall charge neutral.

Additional features and advantages will be set forth in the detailed description which follows, and in part will be readily apparent to those skilled in the art from that description or recognized by practicing the embodiments described herein, including the detailed description which follows and the claims. It is to be understood that both the foregoing general description and the following detailed description describe various embodiments and are intended to provide an overview or framework for understanding the nature and character of the claimed subject matter.

DETAILED DESCRIPTION

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer," which refers to polymers prepared from two or more different monomers.

"Ethylene-based polymer" shall mean polymers comprising greater than 50% by weight of units that have been derived from ethylene monomer. This includes polyethylene homopolymers or copolymers (meaning units derived from two or more comonomers). Common forms of ethylene-based polymer known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

As used herein, the "solution polymerization reactor" is a vessel that performs solution polymerization, wherein ethylene monomer, optionally with a comonomer, polymerizes or copolymerizes after being dissolved in a non-reactive solvent that contains a catalyst. Heat may be removed or added to the solution polymerization reactors and after the reactors such as by coupling the reactors to one or more heat exchangers. High reactor temperature may be required to keep polymer in liquid state. In the solution polymerization process, hydrogen may be utilized; however, it is not required in all solution polymerization processes.

Ziegler-Natta catalysts are commonly used to produce ethylene-based polymers in copolymerization processes for copolymerizing ethylene and one or more alpha-olefin comonomers. In these copolymerization processes conducted with typical Ziegler-Natta catalysts, polymer average molecular weight decreases rapidly as polymerization temperature increases. However, high polymerization temperatures in solution polymerization processes increase production throughput and produce ethylene-based polymers with desired polymer properties, such as superior optics and dart/tear balance. Increasing the molecular weight capability of a Ziegler-Natta catalyst may expand its ability to make new products and may enable polymerization at higher polymerization temperatures.

The present disclosure is directed to Ziegler-Natta-type heterogeneous procatalysts and catalyst systems that exhibits increased molecular weight capability. The catalyst systems disclosed herein may include a heterogeneous procatalyst and a cocatalyst. The heterogeneous procatalyst may include a titanium species, a preformed magnesium chloride ($MgCl_2$) support, a chlorinating agent, and a donor compound. The donor compound may be a metal-ligand complex having the structural formula $(L)_nM(Y)_m(XR^2)_b$, where: M is a metal cation; each L is a neutral ligand or (=O); Y is a halide or $(C_1-C_{20})$alkyl; each $XR^2$ is an anionic ligand in which X is a heteroatom or a heteroatom-containing functional group and $R^2$ is $(C_1-C_{20})$hydrocarbyl or $(C_1-C_{20})$heterohydrocarbyl; n is 0 (zero), 1, or 2; m is 0 (zero), 1, 2, 3, or 4; and b is 1, 2, 3, 4, 5, or 6. The metal-ligand complex may be overall charge neutral. The preformed $MgCl_2$ support may have a specific surface area of at least 100 meters squared per gram ($m^2/g$). The metal-ligand complex donor compound can be incorporated into the heterogeneous procatalyst or can be added to a preformed heterogeneous procatalyst to modify the preformed heterogeneous procatalyst to produce the heterogeneous procatalyst. In some embodiments, the metal-ligand complex may be incorporated into the catalyst system as an external donor such that the catalyst system includes a preformed heterogeneous procatalyst, the cocatalyst, and the metal-ligand complex.

A polymerization process is also disclosed that includes contacting ethylene and optionally one or more α-olefin comonomers with a catalyst system that includes the heterogeneous procatalyst according to embodiments disclosed herein and optionally a cocatalyst to form an ethylene-based polymer. The ethylene-based polymers produced in the presence of the catalyst systems disclosed herein may exhibit increased molecular weights, increased high density fractions, and decreased content of the optional comonomer.

In some embodiments, a process for producing the heterogeneous procatalyst may include preparing the preformed $MgCl_2$ support, contacting the $MgCl_2$ support with a chlorinating agent to condition the $MgCl_2$ support, contacting the conditioned $MgCl_2$ support with the titanium species, and contacting the slurry including the conditioned $MgCl_2$ support and titanium species with a donor compound. The preformed $MgCl_2$ support may be the reaction product of an alkyl magnesium compound solution in a hydrocarbon diluent and a chloride source. In some embodiments, the hydrocarbon diluent is not separated from the $MgCl_2$ support. In other embodiments, the hydrocarbon diluent may be separated from the $MgCl_2$ support. Preparing the preformed $MgCl_2$ support may include reacting an organomagnesium compound, or a complex including an organomagnesium compound, with a chloride compound, such as a metallic or non-metallic chloride, under conditions suitable to make the preformed $MgCl_2$ support, as described subsequently herein. Examples of organomagnesium compounds and/or complexes may include, but are not limited to, magnesium $C_2-C_8$ alkyls and aryls, magnesium alkoxides and aryloxides, carboxylated magnesium alkoxides, and carboxylated magnesium aryloxides, or combinations of these. In some embodiments, the organomagnesium compound may include a magnesium $C_2$-$C_8$ alkyl, a magnesium $C_1$-$C_8$ alkoxides, or combinations of these. In some embodiments, the organomagnesium compound may be an alkyl magnesium compound, such as butylethylmagnesium.

The organomagnesium compound or complex may be soluble in a hydrocarbon diluent, such as an inert hydrocarbon diluent. Examples of hydrocarbon diluents may include, but are not limited to, liquefied ethane, propane, isobutane, n-butane, n-hexane, the various isomeric hexanes, isooctane, paraffinic mixtures of alkanes having from 5 to 20 carbon atoms, cyclohexane, methylcyclopentane, dimethylcyclohexane, dodecane, industrial solvents composed of saturated or aromatic hydrocarbons such as kerosene, naphthas, and combinations thereof. In some embodiments, the hydrocarbon diluent may be substantially free of any olefinic compounds and other impurities. As used herein, the term "substantially free" of a constituent means that a composition includes less than 0.1 wt. % of the constituent (e.g., impurity, compound, element, etc.). In some embodiments, the hydrocarbon diluent may have a boiling point in the range from about −50° C. to about 200° C. In some embodiments, the hydrocarbon diluent may include an isoparaffin solvent. Examples of isoparaffin solvents may include, but are not limited to, ISOPAR™ synthetic paraffin solvents available from ExxonMobile (e.g., ISOPAR™ E paraffin solvent) and special boiling point (SBP) solvents available from Shell Chemicals (e.g., SBP 100/140 high purity de-aromatised hydrocarbon solvent). Other examples of hydrocarbon diluents may include ethylbenzene, cumene, decalin, and combinations thereof.

In some embodiments, the process of preparing the preformed $MgCl_2$ support may include dispersing the organomagnesium compound in the hydrocarbon diluent to form a solution or a slurry. The concentration of the organomegnesium compound in the hydrocarbon diluent may be sufficient that, when the chloride compound and the organomagnesium compound are combined, the resultant slurry may include a concentration of the organomagnesium compound sufficient to provide for efficient production of the $MgCl_2$ support without using an excessive amount of the hydrocarbon diluent. The concentration of the organomagnesium compound should not be so great that the slurry cannot be properly mixed/agitated or fluidly transported during and after synthesis. The solution or slurry of the organomagnesium compound dispersed in the hydrocarbon diluent may be contacted with the chloride compound to produce the $MgCl_2$ support. The chloride compound may be a metallic or non-metallic chloride. For example, in some embodiments, the chloride compound may be hydrogen chloride gas. In some embodiments, the solution or slurry of organomagnesium compound and chloride compound may be contacted at a temperature of from −25° C. to 100° C., or from 0° C. to 50° C. In some embodiments, the solution or slurry of organomagnesium compound and metallic or non-metallic chloride may be contacted for a time of from 1 hour to 12 hours, or from 4 hours to 6 hours.

The reaction of the chloride compound with the organomagesium compound may produce the preformed $MgCl_2$ support, which may be a $MgCl_2$ slurry that includes $MgCl_2$ particles dispersed in the hydrocarbon diluent. In some embodiments, the $MgCl_2$ slurry may have a concentration of $MgCl_2$ of from 0.05 mol/L to 10.0 mol/L, or about 0.2 mol/L. The preformed $MgCl_2$ support may have a specific surface area of at least 100 m²/g. For example, in some embodiments, the preformed $MgCl_2$ support may have an average surface area of from 100 m²/g to 1000 m²/g, from 200 m²/g to 800 m²/g, or from 300 m²/g to 700 m²/g.

In some embodiments, the preformed $MgCl_2$ support may be further processed by thermally treating the preformed $MgCl_2$ support at a temperature of at least 100° C. and for a time of at least 30 minutes to produce a thermally treated $MgCl_2$ support dispersed in the hydrocarbon diluent. For example, in some embodiments, the preformed $MgCl_2$ support including the $MgCl_2$ particles dispersed in the hydrocarbon diluent may be thermally treated at a temperature of greater than or equal to 100° C., greater than or equal to 120° C., greater than or equal to 130° C., greater than or equal to 150° C., or even greater than or equal to 190° C. to produce the preformed $MgCl_2$ support. In some embodiments, the $MgCl_2$ slurry may be thermally treated at a temperature of from 100° C. to 500° C., from 100° C. to 300° C., from 100° C. to 200° C., from 120° C. to 500° C., from 120° C. to 300° C., from 120° C. to 200° C., from 130° C. to 500° C., from 130° C. to 300° C., from 130° C. to 200° C., from 150° C. to 500° C., from 150° C. to 300° C., from 150° C. to 200° C., from 190° C. to 500° C., or from 190° C. to 300° C. to produce the thermally treated $MgCl_2$ support. In some embodiments, the $MgCl_2$ slurry may be thermally treated at two or more different temperatures during the thermal treatment.

The preformed $MgCl_2$ support may be thermally treated for a time greater than or equal to 30 minutes (0.5 hours), greater than or equal to 1 hour, greater than or equal to 2 hours, greater than or equal to 3 hours, greater than or equal to 6 hours, or greater than or equal to 10 hours to produce the thermally treated $MgCl_2$ support. For example, in some embodiments, the preformed $MgCl_2$ support may be thermally treated for a time of from 0.5 hours to 240 hours, from 0.5 hours to 120 hours, from 0.5 hours to 48 hours, from 0.5 hours to 24 hours, from 1 hour to 240 hours, from 1 hour to 120 hours, from 1 hour to 48 hours, from 1 hour to 24 hours, from 2 hours to 240 hours, from 2 hours to 120 hours, from 2 hours to 48 hours, from 2 hours to 24 hours, from 3 hours to 240 hours, from 3 hours to 120 hours, from 3 hours to 48 hours, from 3 hours to 24 hours, from 6 hours to 240 hours, from 6 hours to 120 hours, from 6 hours to 48 hours, from 6 hours to 24 hours, from 10 hours to 240 hours, from 10 hours to 120 hours, from 10 hours to 48 hours, or from 10 hours to 24 hours to produce the thermally treated $MgCl_2$ support. In some embodiments, when the thermal treatment temperature is higher than 200° C., the treatment time can be reduced to less than 30 minutes, or less than 10 minutes.

In some embodiments, thermally treating the preformed $MgCl_2$ support may include agitating the $MgCl_2$ slurry. Agitating the $MgCl_2$ slurry may be performed simultaneously with thermally treating the $MgCl_2$ slurry at a temperature of at least 100° C. and for at least 30 minutes. In some embodiments, the $MgCl_2$ slurry may be agitated at a speed of up to 1000 rotations per minute (rpm), up to 100 rpm, from 1 rpm to 1000 rpm, or from 1 rpm to 100 rpm. In some embodiments, thermally treating the $MgCl_2$ support may include thermally treating the $MgCl_2$ in an inert atmosphere. "Inert atmosphere" refers to an atmosphere that consists of compounds and/or gases that do not react with the $MgCl_2$ support or any other constituent of the heterogeneous procatalyst. For example, thermally treating the $MgCl_2$ support may be conducted in the presence of an inert gas, such as nitrogen or argon for example, that does not react with the $MgCl_2$.

In some embodiments, the thermally treated $MgCl_2$ support may be a product of thermally treating the preformed $MgCl_2$ support. The thermally treated $MgCl_2$ support may include the thermally treated $MgCl_2$ particles dispersed in the hydrocarbon diluent. Not intending to be bound by theory, it is believed that thermally treating the $MgCl_2$ support may modify the surface morphology and surface area of the $MgCl_2$ particles. The resultant change in surface morphology and surface area of the $MgCl_2$ resulting from thermal treatment may modify the activity of the heterogeneous procatalyst for polymerizing olefins and change the polymerization behaviors of the heterogeneous procatalyst as well as the molecular weight and composition of the resultant polymer. In some embodiments, following thermal treatment, the thermally treated $MgCl_2$ support may have an average surface area of from 50 $m^2/g$ to 1000 $m^2/g$, from 200 $m^2/g$ to 1000 $m^2/g$, or from 400 $m^2/g$ to 1000 $m^2/g$. In some embodiments, the thermally treated $MgCl_2$ support may have an average surface area of about 400 $m^2/g$.

Following preparation of the preformed $MgCl_2$ support, the preformed $MgCl_2$ support may be contacted with a chlorinating agent. The chlorinating agent may have a structural formula $A(Cl)_x(R^1)_{3-x}$ or $Si(Cl)_y(R^1)_{4-y}$, where A is an element selected from the group consisting of boron, aluminum, gallium, indium, and tellurium, $R^1$ is a $(C_1-C_{30})$ hydrocarbyl, x is 1, 2, or 3, and y is 1, 2, 3, or 4. In some embodiments, A may be aluminum. In some embodiments, the chlorinating agent may have structural formula $Al(Cl)_x(R^1)_{3-x}$ or structural formula $Si(Cl)_y(R^1)_{4-y}$, where $R^1$ is a $(C_1-C_{30})$ hydrocarbyl, x is 1, 2, or 3, and y is 1, 2, 3, or 4. In some embodiments, the chlorinating agent may be chosen from aluminum trichloride, methylaluminum dichloride, dimethylaluminum chloride, ethylaluminum dichloride, diethylaluminum chloride, ethylaluminum sesquichloride, isobutylaluminum dichloride, diisobutylaluminum chloride, n-hexylaluminum dichloride, di-n-hexylaluminum chloride, n-octylaluminum dichloride, di-n-octylalumnium chloride, boron trichloride, phenylboron dichloride, dicyclohexylboron chloride, silicon tetrachloride, methyltrichlorosilane, dimethylchlorosilane, chlorotrimethylsilane, ethyl-trichlorosilane, dichlorodiethylsilane, chlorotriethylsilane, n-propyltrichlorosilane, dichlorodi(n-propyl)silane, chlorotri(n-propyl)silane, isopropyltrichlorosilane, dichlorodiisopropylsilane, chlorotriisopropylsilane, n-butyltrichlorosilane, dichlorodi(n-butyl)silane, chlorotri(n-butyl)silane, isobutyltrichlorosilane, dichlorodiisobutylsilane, chlorotriisobutylsilane, cyclopentyltrichlorosilane, dichlorodicyclopentylsilane, n-hexyltrichlorosilane, cyclohexyltrichlorosilane, dichlorodicyclohexylsilane, or combinations of these. In some embodiments, the chlorinating agent may be chosen from ethylaluminum dichloride, diethylaluminum chloride, ethylaluminum sesquichloride, isobutylaluminum dichloride, and diisobutylaluminum chloride.

The preformed $MgCl_2$ support may be contacted with the chlorinating agent under conditions sufficient to condition the preformed $MgCl_2$ support. For example, the preformed $MgCl_2$ support may be contacted with the chlorinating agent at a temperature of from 0° C. to 50° C., from 0° C. to 35° C., from 25° C. to 50° C., or from 25° C. to 35° C. The preformed $MgCl_2$ support may be contacted with the chlorinating agent at such temperature for a time of from 4 hours to 24 hours, from 4 hours to 12 hours, from 6 hours to 24 hours, or from 6 hours to 12 hours. Not intending to be bound by any theory, it is believed that conditioning the preformed $MgCl_2$ support by contacting the preformed $MgCl_2$ support with the chlorinating agent may facilitate or enhance adsorption of additional metals, such as the titanium species for example, onto the preformed $MgCl_2$ support. Including the chlorinating agent in the heterogeneous procatalyst may also convert any Ti and Mg compounds that are not chlorides into titanium chlorides and $MgCl_2$. The heterogeneous procatalyst may include an amount of the chlorinating agent sufficient to condition the $MgCl_2$. In some embodiments, the heterogeneous procatalyst may include an amount of the chlorinating agent less than an amount resulting in excess chloride sufficient to chlorinate the metal-ligand complex donor compound. In some embodiments, the heterogeneous procatalyst may include a molar ratio of the chlorinating agent to the $MgCl_2$ in the heterogeneous procatalyst of from 0.05:1 to 2:1, from 0.05:1 to 1:1, from 0.05:1 to 0.5:1, from 0.05:1 to 0.3:1, from 0.07:1 to 2:1, from 0.07:1 to 1:1, from 0.07:1 to 0.5:1, from 0.07:1 to 0.3:1, from 0.1:1 to 2:1, from 0.1:1 to 1:1, from 0.1:1 to 0.5:1, or from 0.1:1 to 0.3:1.

The preformed $MgCl_2$ support conditioned by the chlorinating agent may be contacted with a titanium species. The titanium species may be any titanium compound or titanium complex having catalytic activity after being incorporated in the procatalyst upon activation with a cocatalyst. For example, in some embodiments, the titanium species may include a titanium halide, a titanium alkoxide, or combinations thereof. In some embodiments, the titanium species is $TiCl_{4-c}(OR^3)$, or $TiCl_{3-d}(OR^3)_d$, wherein $R^3$ is $(C_1-C_{20})$ hydrocarbyl; c is 0, 1, 2, 3, or 4; and d is 0, 1, 2, or 3. For example, in some embodiments, the titanium species may include, but is not limited to, titanium (IV) tetrachloride ($TiCl_4$), titanium (III) trichloride ($TiCl_3$), diethoxytitanium (IV) dichloride ($TiCl_2(OC_2H_5)_2$), diisopropoxytitanium(IV) dichloride ($TiCl_2(O-i-C_3H_7)_2$), di-n-butoxytitanium(IV) dichloride ($TiCl_2(O-n-C_4H_9)_2$), diisobutoxytitanium(IV) dichloride ($TiCl_2(O-i-C_4H_9)_2$), triisopropoxytitanium(IV) chloride ($TiCl(O-i-C_3H_7)_3$), tri-n-butoxytitanium(IV) chloride ($TiCl(O-n-C_4H_9)_3$), triisobutoxytitanium(IV) chloride ($TiCl(O-i-C_4H_9)_3$), titanium(IV) tetraisopropoxide (Ti($O^iPO_4$), alternatively ($Ti(O-i-C_3H_7)_4$), titanium(IV) ethoxide ($Ti(OC_2H_5)_4$), titanium(IV) n-butoxide ($Ti(O-n-C_4H_9)_4$), titanium(IV) isobutoxide ($Ti(O-i-C_4H_9)_4$), titanium(IV) 2-ethylhexoxide ($Ti(OCH_2CH(C_2H_5)(C_4H_9))_4$), dichlorobis (2,2,6,6-tetramethyl-3,5-heptanedionato)titanium(IV), tris (2,2,6,6-tetramethyl-3,5-heptane dionato)titanium(III), tetrachlorobis(tetrahydrofuran) titanium(IV), trichlorotris(tetrahydrofuran)titanium(III), methyltitanium (IV) trichloride, or combinations of these. In some embodiments, the titanium species may be titanium (IV) tetrachloride or titanium (IV) tetraisopropoxide ($Ti(O^iPO_4)$).

The preformed $MgCl_2$ support conditioned by the chlorinating agent may be contacted with the titanium species under conditions sufficient to form a slurry in which at least a portion of the titanium species is adsorbed onto the preformed $MgCl_2$ support. For example, in some embodiments, the preformed $MgCl_2$ support conditioned by the chlorinating agent may be contacted with the titanium species at a temperature of from 0° C. to 50° C., from 0° C. to 35° C., from 25° C. to 50° C., or from 25° C. to 35° C. In some embodiments, the preformed $MgCl_2$ support conditioned by the chlorinating agent may be contacted with the titanium species at such temperature for a time of from 1 minute to 72 hours, from 0.5 hour to 24 hours, from 1 hour to 12 hours, from 1 hour to 6 hours, from 3 hours to 72 hours, from 3 hours to 24 hours, from 3 hours to 12 hours, from 6 hours to 72 hours, from 6 hours to 24 hours, or from 6 hours to 12 hours. In some embodiments, the heterogeneous procatalyst may include a molar ratio of the titanium species to the $MgCl_2$ in the heterogeneous procatalyst of from 0.005:1 to 0.25:1, from 0.005:1 to 0.15:1, from 0.005:1 to 0.07:1, from 0.01:1 to 0.25:1, from 0.01:1 to 0.15:1, from 0.01:1 to 0.07:1, from 0.05:1 to 0.25:1, from 0.05:1 to 0.15:1, or from 0.05:1 to 0.07:1.

Preparing the heterogeneous procatalyst may further include contacting the slurry that includes the preformed MgCl$_2$ support, the chlorinating agent, and the titanium species, with the donor compound to produce the heterogeneous procatalyst. An electron donor compound refers to an organic molecule containing a functional group that is able to donate a set of two paired electrons to an electron acceptor, usually a metal atom. In some embodiments, the donor compound may be a metal-ligand complex. Not intending to be bound by theory, it is believed that the metal-ligand complex (L)$_n$M(Y)$_m$(XR$^2$)$_b$ can act like an electron donor molecule through the lone pair(s) of electrons available from the heteroatom(s) in the complex. As previously described, the metal-ligand complex may have the structural formula (L)$_n$M(Y)$_m$(XR$^2$)$_b$, where: M is a metal cation; each L is a neutral ligand or (═O); each Y is a halide or (C$_1$-C$_{20}$) alkyl; each XR$^2$ is an anionic ligand in which X is a heteroatom or contains a heteroatom-containing functional group and R$^2$ is (C$_1$-C$_{20}$)hydrocarbyl or (C$_1$-C$_{20}$) heterohydrocarbyl; n is 0 (zero), 1, or 2; m is 0, 1, 2, 3, or 4; and b is 1, 2, 3, 4, 5, or 6. The metal-ligand complex may be overall charge neutral. In some embodiments, the metal-ligand complex may be soluble in hydrocarbon solvents, such as the hydrocarbon diluents previously discussed herein. For example, in some embodiments, the metal-ligand complex may be soluble in the hydrocarbon diluent used to produce the MgCl$_2$ slurry of the preformed MgCl$_2$ support. Not intending to be bound by any theory, it is believed that being soluble in the hydrocarbon solvent of the MgCl$_2$ slurry affords better dispersion of the metal-ligand complex in the slurry and facilitates interaction between the metal-ligand complex and the titanium species on MgCl$_2$ surface.

In some embodiments, the metal cation M may be a transition metal cation, including lanthanides and actinides. For example, in some embodiments, M may be chosen from cerium, chromium, cobalt, copper, iron, lanthanum, manganese, neodymium, nickel, niobium, samarium, scandium, tantalum, titanium, tungsten, vanadium, yttrium, zinc, or zirconium, in any oxidation state, or combinations of these. Alternatively, in some embodiments, the metal cation M may be a main group metal cation. Main group metal cation refers to cations comprising a metal/metalloid from groups 1, 2, and 13-16 of the IUPAC Periodic Table of the Elements. For example, in some embodiments, the metal cation M may include but is not limited to calcium, magnesium, aluminum, gallium, indium, thallium, or tin in any oxidation state. In some embodiments, M may be chosen from vanadium, titanium, chromium, scandium, zirconium, niobium, magnesium, calcium, or combinations of these.

In some embodiments, one or more than one L may be a neutral ligand. In some embodiments, one or more than one L may include a neutral ligand comprising an oxygen-containing, a nitrogen-containing, or a phosphorous-containing compound, such as ammonia, nitriles, pyridines, amines, phosphines, or combinations of these. Examples of neutral ligands may include, but are not limited to, ethers, ketones, esters, amines, pyridines, phosphines, phosphites, other neutral ligands, or combinations of these. In some embodiments, one or more than one L may be an oxo group (═O). In some embodiments, X may be oxygen. In some embodiments, X may be a carboxylate group (—OC(═O)—).

In some embodiments, the metal-ligand complex may be a metal alkoxide or a metal oxyalkoxide. In some embodiments, the metal-ligand complex may be a metal alkoxide having structural formula M(OR$^2$)$_e$, where M is the metal cation; e is 2, 3, 4, 5, or 6; and R$^2$ is (C$_1$-C$_{20}$)hydrocarbyl or (C$_1$-C$_{20}$)heterohydrocarbyl or its halide derivatives. In other embodiments, the metal ligand complex may be a metal oxyalkoxide having structural formula M(═O)(OR$^2$)$_f$, where M is the metal cation; f is 1, 2, 3, or 4; and R$^2$ is (C$_1$-C$_{20}$)hydrocarbyl or (C$_1$-C$_{20}$) heterohydrocarbyl, or its halide derivatives. In some embodiments, the metal-ligand complex may include at least one of vanadium(V) oxytriethoxide, vanadium(V) oxytri-n-propoxide (VO(O"Pr)$_3$), vanadium(V) oxytri-n-butoxide (VO(O"Bu)$_3$), vanadium (V) oxytriisopropoxide (VO(O$^i$Pr)$_3$), titanium(IV) tetraisopropoxide (Ti(O$_i$Pr)$_4$), titanium(IV) ethoxide, diethoxytitanium(IV) dichloride, diisopropoxytitanium(IV) dichloride, di-n-butoxytitanium(IV) dichloride, diisobutoxytitanium (IV) dichloride, triisopropoxytitanium(IV) chloride, tri-n-butoxytitanium(IV) chloride, triisobutoxytitanium(IV) chloride, titanium(IV) tetraisopropoxide (Ti(O$^i$Pr)$_4$), titanium (IV) n-butoxide, titanium(IV) isobutoxide, titanium(IV) 2-ethylhexoxide, niobium(V) n-butoxide, tantalum(V) n-butoxide, scandium(III) isopropoxide, yttrium(III) n-butoxide, lanthanum(III) isopropoxide, samarium(III) isopropoxide, molybdenum(V) ethoxide, iron(III) ethoxide, cerium(IV) isopropoxide, aluminum isopropoxide, or combinations thereof.

In some embodiments, the metal-ligand complex may be a metal carboxylate or a metal oxycarboxylate. In some embodiments, the metal-ligand complex may be a metal carboxylate having structural formula M(OC(O)R$^2$)$_g$, where R$^2$ is (C$_1$-C$_{20}$)hydrocarbyl or (C$_1$-C$_{20}$)heterohydrocarbyl and g is 2, 3, 4, 5, or 6. In some embodiments, the metal-ligand complex may be a metal oxycarboxylate having structural formula M(═O)(OC(O)R$^2$)$_h$, where R$^2$ is (C$_1$-C$_{20}$)hydrocarbyl or (C$_1$-C$_{20}$)heterohydrocarbyl and h is 1, 2, 3, or 4. In some embodiments, the metal-ligand complex may include at least one of titanium(IV) 2-ethylhexanoate, vanadyl acetate, vanadium(IV) oxide stearate, chromium(III) 2-ethylhexanoate, manganese(II) 2-ethylhexanoate, iron 2-ethylhexanoate, cobalt(II) 2-ethylhexanoate, nickel(II) naphthenate, nickel(II) 2-ethylhexanoate, copper(II) 2-ethylhexanoate, copper(II) naphthenate, zinc 2-ethylhexanoate, neodymium(III) 2-ethylhexanoate, neodymium(III) neodecanoate, zirconium(IV) 2-ethylhexanoate, magnesium 2-ethylhexanoate, calcium(II) 2-ethylhexanoate, calcium(II) naphthenate, or combinations thereof. The naphthenate refers to metal salts of naphthenic acids. Naphthenic acids are mixtures of cycloaliphtic carboxylic acids and may be represented by the formula C$_n$H$_{2(n-z)}$O$_2$, where n is 5 to 30; and z is 0 to 4. The naphthenic acids may be isolated from crude oil.

In some embodiments, the donor compound such as the metal-ligand complex as previously described, for example, may be combined with the slurry comprising the preformed MgCl$_2$ support component, titanium species, and chlorinating agent dispersed in the hydrocarbon diluent after adsorption of the titanium species onto the preformed MgCl$_2$ support to produce the heterogeneous procatalyst. In some embodiments, the metal-ligand complex may be combined with the slurry of preformed MgCl$_2$ support, titanium species, and chlorinating agent and mixed for a period of from 0.5 minutes to 10 minutes immediately prior to adding a co-catalyst and conducting the polymerization reaction. In some embodiments, the metal-ligand complex may be combined with the slurry of preformed MgCl$_2$ support, titanium species, and chlorinating agent and mixed for more than 10 minutes before adding a co-catalyst and conducting the polymerization reaction. The heterogeneous procatalyst may have a molar ratio of the metal-ligand complex (i.e., donor compound) to the titanium species in the heterogeneous procatalyst of from 0.1:1 to 10:1, from 0.5:1 to 5:1, 1:1 to 1:3, from 1:1 to 1:2.5, from 1:1 to 1:2, from 1:1.5 to 1:3, from 1:1.5 to 1:2.5, from 1:1.5 to 1:2, or from 1:2 to 1:3.

In some embodiments, the heterogeneous procatalyst may optionally include one or more second transition metals, where at least a portion of the second metals is adsorbed onto the preformed $MgCl_2$ support to produce a multimetallic heterogeneous procatalyst. The second transition metal may be independently selected from zirconium, hafnium, vanadium, scandium, niobium, tantalum, chromium, molybdenum, and tungsten. In some embodiments, the second transition metal may be independently selected from zirconium, hafnium, vanadium, and chromium. These second transition metals may be incorporated into the heterogeneous procatalyst in any of a variety of ways known to those skilled in the art, but generally contact between the preformed $MgCl_2$ support including the titanium species and the selected second transition metal(s), in, e.g., liquid phase such as in an appropriate hydrocarbon diluent, may be suitable to ensure deposition of the second transition metal(s) to form the multi-metallic heterogeneous procatalyst. In some embodiments, the second transition metals may be incorporated into the heterogeneous procatalyst before the metal-ligand complex.

Not intending to be bound by theory, it is believed that in the presence of excess chlorinating agent, $Al(Cl)_x(R^1)_{3-x}$ or $Si(Cl)_y(R^1)_{4-y}$, a portion of the metal-ligand complex having a structural formula $(L)_nM(Y)_m(XR^2)_b$ may be chlorinated and lose its effects as an electron donor. Therefore, in some embodiments in which the titanium species is $TiCl_{4-c}(OR^3)_c$ or $TiCl_{3-d}(OR^3)_d$, the molar ratio of the total amount of Cl in the chlorinating agent $(Al(Cl)_x(R^1)_{3-x}$ and/or $Si(Cl)_y(R^1)_{4-y})$ to the total amount of $OR^3$ and $XR^2$ (e.g., sum of $OR^3$ and $XR^2$) in the heterogeneous procatalyst is from 0.33 to 1.45, from 0.40 to 1.14, or from 0.50 to 0.94.

In some embodiments, when the metal-ligand complex is a metal alkoxide, metal oxyalkoxide, metal carboxylate, metal oxycarboxylate, or a halide derivative of these compounds, and the metal-ligand complex is the same as the Ti species or the second transition metal, the metal-ligand complex may be added to the preformed procatalyst that comprises the same Ti compound or the same compound of the second transition metal. For example, when $Ti(O^iPr)_4$ is used as the Ti species in the preformed heterogeneous procatalyst and also used as the metal-ligand complex, $Ti(O^iPr)_4$ may be added as the metal-ligand complex donor to the preformed heterogeneous procatalyst produced using the $Ti(O^iPr)_4$ as Ti species. In another embodiment, when $VO(O^nPr)_3$ is used as the second transition metal as well as the metal-ligand complex, the $VO(O^nPr)_3$ may be added as the metal-ligand complex donor to the preformed heterogeneous procatalyst made using $VO(O^nPr)_3$ as the second transition metal.

As previously discussed, in some embodiments, the heterogeneous procatalyst may include a preformed heterogeneous procatalyst and the metal-ligand complex. As used in this disclosure, the term "preformed heterogeneous procatalyst" refers to an existing functional Zeigler-Natta procatalyst composition that has already been determined to have catalytic activity for catalyzing polymerization and copolymerization reactions and becomes active when combined with a cocatalyst. In some embodiments, the preformed heterogeneous procatalyst may include at least a titanium species and a $MgCl_2$ support. For example, in some embodiments, the titanium species may be titanium tetrachloride ($TiCl_4$) so that the preformed heterogeneous procatalyst includes $TiCl_4$ and a $MgCl_2$ support. In some embodiments, the titanium species may be titanium tetraisopropoxide ($Ti(O^iPr)_4$) so that the preformed heterogeneous procatalyst includes $Ti(O^iPr)_4$ and a $MgCl_2$ support. It is understood that at least a portion of $Ti(O^iPr)_4$ may be converted into Ti chloride(s) upon chlorination by chlorinating agents. In some embodiments, the preformed heterogeneous procatalyst may include any commercially available Zeigler-Natta procatalyst that includes at least $TiCl_4$ and a $MgCl_2$ support and becomes active upon combination with a cocatalyst.

The heterogeneous procatalyst may be prepared by contacting the metal-ligand complex with the preformed heterogeneous procatalyst. For example, in some embodiments, the process for preparing the heterogeneous procatalyst may include providing a preformed heterogeneous procatalyst that includes the titanium species and the $MgCl_2$ support. The process may further include contacting the preformed heterogeneous procatalyst with the metal-ligand complex without further chlorination. Not intending to be bound by theory, it is believed that further chlorination may convert the metal-ligand complex into chloride compound(s) and thus diminish its effects as an electron donor.

In some embodiments, the heterogeneous procatalyst may include a preformed heterogeneous procatalyst and the metal-ligand complex, where the preformed heterogeneous procatalyst includes a titanium species—such as titanium tetrachloride—and a $MgCl_2$ support. In these embodiments, addition of the metal-ligand complex to the preformed heterogeneous procatalyst may modify the preformed heterogeneous procatalyst to produce the heterogeneous procatalyst of the present disclosure that is capable of producing ethylene-based polymers with greater Mw and high density fraction and reduced comonomer weight percent. The contacting of the preformed heterogeneous procatalyst and the metal-ligand complex may occur under a wide variety of conditions. Such conditions may include, for example, contacting the preformed heterogeneous procatalyst and metalligand complex under an inert atmosphere such as nitrogen, argon or other inert gas at temperatures of from 0° C. to 100° C., from 0° C. to 80° C., from 15° C. to 80° C., from 15° to 60° C., from 15° C. to 50° C., or from 20° C. to 50° C. After the contacting, it is not necessary to separate hydrocarbon soluble components from hydrocarbon insoluble components. Time for contact between the preformed heterogeneous procatalyst and the metal-ligand complex prior to contacting a cocatalyst to form a catalyst system may greater than or equal to 10 minutes, greater than or equal to 0.5 hours, greater than or equal to 1 hour, greater than or equal to 24 hours, greater than or equal to 168 hours, or greater than or equal to 700 hours. It is believed that the effects of the metal-ligand complex may change slightly or moderately over aging. However, those effects remain over prolong period of time. The molar ratio of the metal-ligand complex (i.e., donor compound) to the titanium species in the preformed heterogeneous procatalyst may be from 0.1:1 to 10:1, from 0.5:1 to 5:1, 1:1 to 1:3, from 1:1 to 1:2.5, from 1:1 to 1:2, from 1:1.5 to 1:3, from 1:1.5 to 1:2.5, from 1:1.5 to 1:2, or from 1:2 to 1:3.

The heterogeneous procatalyst may be activated by contacting the heterogeneous procatalyst with a cocatalyst. The cocatalyst may include at least one organometallic compound such as an alkyl or haloalkyl of aluminum, aluminoxane, alkylaluminum alkoxide, an alkylaluminum halide, a Grignard reagent, an alkali metal aluminum hydride, a metal alkyl, an alkali metal borohydride, an alkali metal hydride, an alkaline earth metal hydride, or the like. In some embodiments, the cocatalyst may be an organoaluminum compound. In some embodiments, the cocatalyst may be chosen from an alkylaluminum, a haloalkylaluminum, an alkylaluminum halide, and mixtures thereof. In some embodiments, the cocatalyst may be chosen from triethylalumnium, trimethylalumnium, tri-n-butylalumnium, tri-isobutylalumnium, tri-n-hexylalumnium, tri-n-octylalumnium, diethylalumnum chloride, methylaluminoxane (MAO), modified methylaluminoxane (MMAO), diethylaluminum ethoxide, and mixtures thereof. As previously discussed, the catalyst system may include the heterogeneous procatalyst and the cocatalyst. Preparing the catalyst system may include contacting the heterogeneous procatalyst with the cocatalyst.

The formation of the catalyst system from reaction of the heterogeneous procatalyst and the cocatalyst may be carried out in situ (in place), just prior to entering the polymerization reactor, or before polymerization. Thus, the contacting of the heterogeneous procatalyst and the cocatalyst (or preformed heterogeneous procatalyst, metal-ligand complex, and cocatalyst) to prepare the catalyst system may occur under a wide variety of conditions. Such conditions may include, for example, contacting the heterogeneous procatalyst and cocatalyst under an inert atmosphere such as nitrogen, argon or other inert gas at temperatures of from 0° C. to 250° C., from 0° C. to 200° C., from 15° C. to 250° C., from 15° to 200° C., from 15° C. to 50° C., or from 150° C. to 250° C. In the preparation of the catalytic reaction product (i.e., catalyst system), it is not necessary to separate hydrocarbon soluble components from hydrocarbon insoluble components. Time for contact between the heterogeneous procatalyst and the cocatalyst prior to the polymerization reaction may be from greater than 0 minutes to 10 days, from greater than 0 minutes to 60 minutes, from greater than 0 minutes to 5 minutes, from 0.1 minutes to 5 minutes, from 0.1 minutes to 2 minutes, or from 1 minute to 24 hours. Various combinations of these conditions may be employed. In some embodiments, the catalyst system may have a molar ratio of the cocatalyst to the titanium species in the heterogeneous procatalyst of from 0.5:1 to 50:1, 3:1 to 20:1, from 3:1 to 15:1, from 3:1 to 10:1, from 3:1 to 8:1, from 5:1 to 20:1, from 5:1 to 15:1, from 5:1 to 10:1, from 8:1 to 20:1, or from 8:1 to 15:1.

In some embodiments, the metal-ligand complex may be used as an external donor compound instead of being incorporated into the heterogeneous procatalyst. For example, in some embodiments, the catalyst system may include a preformed heterogeneous procatalyst as previously described herein, the metal-ligand complex, and the cocatalyst. The catalyst system may be prepared by contacting the preformed heterogeneous procatalyst, the metal-ligand complex, and the cocatalyst. For example, when the metal-ligand complex is employed as an external donor compound, the metal-ligand complex may be combined with the preformed heterogeneous procatalyst and the cocatalyst immediately prior to introducing the catalyst system to the polymerization reactor system. In some embodiments, a preformed heterogeneous procatalyst as previously described herein, the metal-ligand complex, and the cocatalyst may be simultaneously and separately added to the reactor. In these embodiments, the contacting between the preformed heterogeneous procatalyst and the metal-ligand complex takes place in the polymerization reactor.

Once the catalyst system including the heterogeneous procatalyst and cocatalyst has been prepared, the catalyst system may be used in a polymerization or copolymerization process for polymerizing olefins. For example, in some embodiments, the catalyst system may be utilized in a polymerization or copolymerization process to make ethylene-based polymers, such as linear low density polyethylene (LLDPE) and other ethylene-based polymers. In some embodiments, a polymerization or copolymerization process may include contacting ethylene and optionally one or more α-olefin comonomers with the catalyst system comprising the heterogeneous procatalyst and optionally a cocatalyst to form an ethylene-based polymer. The olefin polymerization/copolymerization reaction may be conducted in a reaction medium. The reaction medium may be a hydrocarbon diluent, such as an isoparaffin, an aliphatic hydrocarbon, or any of the other hydrocarbon diluents previously described in this disclosure. The olefin polymerization/copolymerization process may include contacting the olefin or a combination of olefins with the reaction medium in the presence of the catalyst system, which includes the heterogeneous procatalyst, or a preformed heterogeneous procatalyst and a metal-ligand complex, and the cocatalyst. Conditions may be any that are suitable, and a molecular weight regulator, such as hydrogen for example, may also be present in the reaction vessel to suppress formation of undesirably high molecular weight polymers.

Any ethylene polymerization or copolymerization reaction system may be employed to produce the ethylene-based polymers in the presence of the catalyst systems disclosed herein. Such ethylene polymerization or copolymerization reaction systems may include, but are not limited to, slurry phase polymerization processes, solution phase polymerization processes, gas-phase polymerization processes, and combinations thereof. The polymerization or copolymerization process may be performed in one or more conventional reactors, examples of which may include, but are not limited to, loop reactors, stirred tank reactors, fluidized-bed reactors, batch reactors in parallel or in series, and/or any combinations thereof. In some embodiments, the polymerization process may be performed in two or more reactors in series, parallel, or combinations thereof. In other embodiments, the polymerization process may be conducted in a single reactor. The polymerization process may be a batch polymerization process or a continuous polymerization process. For example, in some embodiments, the polymerization process may be a batch polymerization process, which may be conducted in a stirred tank reactor. In some embodiments, the polymerization process may be continuous, such as a polymerization reaction conducted in a continuous solution polymerization reactor. In some embodiments, the polymerization process may be performed in two continuous solution polymerization reactors in series, and one or more molecular catalysts may be charged to the first reactor and the catalyst systems disclosed herein may be charged to the second reactor. In some embodiments, the polymerization process may be performed in two continuous solution polymerization reactors in series, and the catalyst system disclosed herein may be used in the first reactor, and one or more metallocene or molecular catalysts may be used in the second reactor. In some embodiments, the polymerization process may include a reactor where the catalyst system disclosed herein and one other polymerization catalyst system are present. The other catalyst system may include any Ziegler-Natta catalysts and any molecular catalysts. Molecular catalyst is a polymerization catalyst system comprising a transition metal complex procatalyst with well-defined molecular structure, such as metallocene. In other embodiments, the polymerization process may include two or more polymerization steps. In these embodiments, the catalyst system comprising the heterogeneous procatalyst disclosed herein may be used for any one or a plurality of the polymerization steps.

The polymers produced from polymerization/copolymerization processes utilizing the catalyst systems disclosed herein may be homopolymers of $C_2$-$C_{20}$ alpha-olefins, such as ethylene, propylene, or 4-methyl-1-pentene. In some embodiments, the polymers produced in the presence of the heterogeneous procatalyst may include copolymer of ethylene or propylene with at least one or more alpha-olefins comonomers. In some embodiments, the polymers may be ethylene-based polymers, such as copolymer of ethylene with at least one of the above $C_3$-$C_{20}$ alpha-olefins in combination with other unsaturated comonomers. In some embodiments, the comonomer may be an $\alpha$-olefin comonomer having no more than 20 carbon atoms. For example, in some embodiments, the $\alpha$-olefin comonomer may have from 3 to 20 carbon atoms, from 3 to 10 carbon atoms, or from 3 to 8 carbon atoms. Exemplary $\alpha$-olefin comonomers may include, but are not limited to, propylene, 1-butene, 1-pentene, 1-hexene, 1-heptene, 1-octene, 1-nonene, 1-decene, and 4-methyl-1-pentene. In some embodiments, the ethylene-based polymers may include an $\alpha$-olefin comonomer selected from the group consisting of 1-butene, 1-hexene, and 1-octene. In some embodiments, the ethylene-based polymers produced in the presence of the catalyst systems disclosed herein may be copolymers of ethylene monomer units and comonomer units chosen from 1-butene, 1-hexene, 1-octene, or combinations of these.

In the polymerization/copolymerization process utilizing the catalyst system described herein, polymerization is effected by adding a catalytic amount of the catalyst system to a polymerization reactor containing the selected $\alpha$-olefin monomers (e.g., ethylene and/or one or more than one $\alpha$-olefin comonomers), or vice versa. The polymerization reactor may be maintained at a temperature of from 50° C. to 300° C. For example, in some embodiments, the polymerization reactor may be maintained at temperatures of from 50° C. to 230° C., from 50° C. to 200° C., from 100° C. to 300° C., from 100° C. to 230° C., from 100° C. to 200° C., or from 60° C. to 120° C. In some non-limiting embodiments, the reactants, catalyst system, or both may have a residence time in the polymerization reactor of from 5 minutes to 4 hours, from 5 minutes to 20 minutes, or from 0.5 hours to 4 hours. Longer or shorter residence times may alternatively be employed. It is generally desirable to carry out the polymerization in the absence of moisture and oxygen and in the presence of the catalyst system. The amount of the catalyst system may be sufficient to provide a desired productivity (e.g., yield) of the ethylene-based polymers but not so great that amount of the catalyst system is cost prohibitive. It is understood, however, that the most advantageous catalyst concentration will depend upon polymerization conditions such as temperature, pressure, solvent, and the presence of catalyst poisons.

In some embodiments, the polymerization/copolymerization process may be conducted at pressures that are relatively low, such as pressures of from 150 to 3,000 psig (1.0 to 20.7 MPa), from 250 to 1,000 psig (1.7 to 6.9 MPa), or from 450 to 800 psig (3.1 to 5.5 MPa). However, polymerization/copolymerization in the presence of the catalyst system described herein may be conducted at pressures from atmospheric pressure to pressures determined by the capabilities (e.g., pressure rating) of the polymerization equipment.

In some embodiments, the polymerization/copolymerization process may include a carrier, which may be an inert organic diluent, excess monomer, or both. Oversaturation of the carrier with the polymer may be generally avoided during the polymerization/copolymerization process. If such saturation of the carrier with the polymer occurs before the catalyst system becomes depleted, the full efficiency of the catalyst system may not be realized. In some embodiments, the polymerization/copolymerization process may be operated at conditions sufficient to maintain the amount of polymer in the carrier/diluent at a concentration less than an oversaturation concentration of the polymer. For example in some embodiments, the polymerization/copolymerization process may be operated at under conditions sufficient to maintain the amount of the polymer in the carrier/diluent less than 30 weight percent (wt. %), based on the total weight of the reaction mixture. In some embodiments, the polymerization/copolymerization process may include mixing or stirring the reaction mixture to maintain temperature control and enhance the uniformity of the polymerization reaction throughout the polymerization zone. In some embodiments, such as with more rapid reactions with relatively active catalysts, the polymerization/copolymerization process may include refluxing monomer and diluent, if diluent is included, thereby removing at least some of the heat of reaction. In some embodiments, heat transfer equipment (e.g., heat exchangers, cooling jackets, or other heat transfer means) may be provided for removing at least a portion of the exothermic heat of polymerization.

In some embodiments, the reaction mixture added to the polymerization/copolymerization process may include an amount of ethylene monomer sufficient to maintain reactor stability and increase catalyst efficiency. In some embodiments, the reaction mixture may have a molar ratio of diluent to ethylene monomer of from 1:2 to 1:8, from 1:2 to 1:5, from 1:3 to 1:8, or from 1:3 to 1:5. In some embodiments, a portion of excess ethylene monomer may be vented from the polymerization process to maintain the concentration of ethylene monomer in the reactor.

In some embodiments, the polymerization/copolymerization process may include contacting hydrogen gas with the reaction mixture during the reaction. The hydrogen gas may be operable to reduce molecular weight of the ethylene-based polymer as well as to reduce formation of ultra-high molecular weight molecules of the ethylene-based polymer. In some embodiments, a concentration of the hydrogen gas in the reaction mixture may be maintained at from 0.001 mole to 1 mole of hydrogen per mole of monomer, where the monomer includes the ethylene monomer and any optional $\alpha$-olefin comonomers. The hydrogen may be added to the polymerization reactor with a monomer stream, as a separate hydrogen feed stream, or both. The hydrogen may be added to the polymerization reactor before, during, and/or after addition of the monomer to the polymerization reactor. In some embodiments, the hydrogen may be added either before or during addition of the catalyst system. In some embodiments, the polymerization/copolymerization process may be conducted without introducing hydrogen gas.

The resulting ethylene-based polymer may be recovered from the polymerization mixture by driving off unreacted monomer, comonomer, diluent, or both. In some embodiments, no further removal of impurities may be required. The resultant ethylene-based polymer may contain small amounts of catalyst residue. The resulting ethylene-based polymer may further be melt screened. For example, the ethylene-based polymer may be melted with an extruder and then passed through one or more active screens, positioned in series of more than one, with each active screen having a micron retention size of from 2 μm to about 400 μm. During melt screening, the mass flux of the ethylene-based polymer may be from 5 lb/hr/in² to about 100 lb/hr/in².

The resulting ethylene-based polymers produced with the catalyst systems disclosed herein may exhibit increased Mw, increased HDF, and decreased weight percent of the alpha-olefin comonomer compared to a comparative polymer made with a comparative procatalyst that does not include the metal-ligand complex donor compound, but is otherwise the same. The increased molecular weight capability of the heterogeneous procatalyst and catalyst systems disclosed herein may enable the polymerization/copolymerization processes to be conducted at higher process temperatures, which may enable the polymerization/copolymerization processes to produce ethylene-based polymers at greater production throughput rates and having improved properties, such as optical properties and/or dart/impact balance, compared to polymers made a lesser process temperatures. Additionally, the catalyst systems disclosed herein can be used together with molecular catalyst systems for production of bimodal polymers, where the catalyst systems disclosed herein generate a polymer component with high molecular weight and low comonomer content.

The ethylene-based polymers may include less than 50 percent by weight of units derived from one or more α-olefin comonomers. All individual values and subranges from less than 50 wt. % are included herein and disclosed herein. For example, in some embodiments, the ethylene-based polymers may include less than or equal to 30 wt. %, less than or equal to 20 wt. %, less than or equal to 15 wt. %, less than or equal to 10 wt. %, less than or equal to 8 wt. %, less than or equal to 5 wt. %, or less than or equal to 3 wt. % units derived from one or more α-olefin comonomers. The ethylene-based polymers may include at least 50 percent by weight (wt. %) units derived from ethylene. All individual values and subranges from at least 50 wt. % to 100 wt. % are included herein and disclosed herein. For example, in some embodiments, the ethylene-based polymers may comprise from 70 wt. % to 100 wt. %, from 80 wt. % to 100 wt. %, from 85 wt. % to 100 wt. %, from 90 wt. % to 100 wt. %, from 95 wt. % to 100 wt. %, or even from 97 wt. % to 100 wt. % units derived from ethylene.

The ethylene-based polymers produced in the presence of the catalyst systems disclosed herein may further include additional components such as other polymers and/or additives. Examples of additives may include, but are not limited to, antistatic agents, color enhancers, dyes, lubricants, fillers, pigments, primary antioxidants, secondary antioxidants, processing aids, UV stabilizers, and combinations thereof. In some embodiments, antioxidants, such as IRGAFOS™ 168 and IRGANOX™ 1010 available from Ciba Geigy, may be used to protect the ethylene-based polymer compositions from thermal and/or oxidative degradation. The ethylene-based polymers may contain any amount of the additives. For example, in some embodiments, the ethylene-based polymers may include from 0.0 wt. % to 10.0 wt. %, from 0.0 wt. % to 7.0 wt. %, from 0.0 wt. % to 5.0 wt. %, from 0.0 wt. % to 3.0 wt. %, from 0.0 wt. % to 2.0 wt. %, from 0.0 wt. % to 1.0 wt. %, or even from 0.0 wt. % to 0.5 wt. % additives based on the total weight of the ethylene-based polymer compositions including such additives.

The ethylene-based polymers produced in the presence of the catalyst systems disclosed herein may be included in a wide variety of products including, in particular embodiments, LLDPE, but also high density polyethylenes (HDPE), plastomers, medium density polyethylenes, and polypropylene copolymers. For these and other applications, articles may be prepared showing enhanced overall quality due to the increased average molecular weight and high-density fraction of the ethylene-based polymer. Useful forming operations for the polymers may include, but are not limited to, film, sheet, pipe, and fiber extrusion and co-extrusion as well as blow molding, injection molding, and rotary molding may be pursued. Films may include blown or cast films formed by co-extrusion or by lamination and may be useful as shrink film, cling film, stretch film, sealing film, oriented film, snack packaging, heavy duty bags, grocery sacks, baked and frozen food packaging, medical packaging, industrial liners, agricultural film applications, and membranes, for example, in food-contact and non-food-contact applications. Fibers may include melt spinning, solution spinning, and melt blown fiber operations for use in woven and non-woven form to make filters, diaper fabrics, medical garments, and geotextiles. Extruded articles may include medical tubing, wire and cable coatings, geomembranes, and pond liners. Molded articles may include single and multi-layered constructions in the form of bottles, tanks, large hollow articles, rigid food containers, and toys.

Test Methods

Specific Surface Area

Specific surface area of $MgCl_2$ support was measured by Brunauer, Emmett, Teller (BET) Surface Area Method. A Tristar 3020 Surface Area Analyzer by Micromeritics was used. 30 mL of $MgCl_2$ slurry was filtered to remove solvent and then re-slurried in 30 mL of hexane. The resulting slurry was filtered again under inert atmosphere and washed with additional hexane. This process was repeated once to yield a filtercake of $MgCl_2$. Residual solvent was removed from the filtercake under vacuum. The filtercake was further dried on a Vac Prep 061 by Micromeritics using a 0.5 inch (1.27 cm) sample tube and a Transeal stopper designed for inert sample protection by loading a 0.2 g sample of the vacuum-dried $MgCl_2$ into the tube under inert atmosphere with a Transeal stopper. The sample tube was connected to the Vac Prep 061 unit with nitrogen purging. The sample tube was treated with vacuum by opening the Transeal stopper and the evacuated tube was placed in a heating block with an aluminum tube protector. The sample was dried under the vacuum on the Vac Prep 061 unit at 110° C. for 3 hours. Afterward, nitrogen was introduced into the sample tube. The dried sample was allowed to cool to room temperature before disconnecting the sample tube from the Vac Prep 061 unit to give a fully dried sample. Under inert atmosphere, 0.1500 to 0.2000 g of the fully dried sample was transferred into a clean sample tube with a tube filler rod. The sample tube was then sealed with a Transeal stopper and connected to the Tristar 3020 instrument for surface area measurement. QUICKSTART method was used for acquiring data.

Density

Density is measured in accordance with ASTM D792 and reported in grams/cubic centimeter (g/cc or g/cm³).

Melt Index

Melt index ($I_2$), is measured in accordance with ASTM D1238, under conditions of 190° C. and 2.16 kg of load. Melt Flow Index ($I_2$) was obtained with a CEAST 7026 or an Instron MF20 instrument. The instruments followed ASTM D1238, Methods E and N. The melt index ($I_2$) is reported in grams eluted per 10 minutes (g/10 min). The melt index $I_2$ was used for polymer characterization. A higher $I_2$ value may generally correlates to a lower Mw.

Gel Permeation Chromatography (GPC)

The chromatographic system consisted of a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. For all Light scattering measurements, the 15 degree angle is used for measurement purposes. The autosampler oven compartment was set at 160° C. and the column compartment was set at 150° C. The columns used were 3 Agilent "Mixed B" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters (µL) and the flow rate was 1.0 milliliters/minute (mL/min).

Calibration of the GPC column set was performed with at least 20 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius (° C.) with gentle agitation for 30 minutes. The polystyrene standard peak molecular weights were converted to polyethylene molecular weights using Equation 1 (EQU. 1)(as described in Williams and Ward, J. Polym. Sci., Polym. Let., 6, 621 (1968)).:

$$M_{polyethylene} = A \times (M_{polystyrene})^B \qquad \text{EQU. 1}$$

where M is the molecular weight, A has a value of 0.4315 and B is equal to 1.0.

A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 Mw.

The total plate count of the GPC column set was performed with Eicosane (prepared at 0.04 g in 50 milliliters of TCB and dissolved for 20 minutes with gentle agitation.) The plate count (Equation 2 (EQU. 2)) and symmetry (Equation 3 (EUQ. 3)) were measured on a 200 microliter injection according to the following equations:

$$\text{Plate Count} = 5.54 * \left( \frac{(RV_{PeakMax})}{\text{Peak Width at } \frac{1}{2} \text{ height}} \right)^2 \qquad \text{EQU. 2}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \qquad \text{EQU. 3}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/mL, and the solvent (contained 200 ppm BHT) was added to a pre nitrogen-sparged septa-capped vial, via the PolymerChar high temperature autosampler. The samples were dissolved for 2 hours at 160° C. under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6 (EQU. 4, EQU. 5, and EQU. 6) below, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum^i IR_i}{\sum^i (IR_i / M_{polyethylene_i})} \qquad \text{EQU. 4}$$

$$Mw_{(GPC)} = \frac{\sum^i (IR_i \times M_{polyethylene_i})}{\sum^i IR_i} \qquad \text{EQU. 5}$$

$$Mz_{(GPC)} = \frac{\sum^i (IR_i \times M^2_{polyethylene_i})}{\sum^i (IR_i \times M_{polyethylene_i})} \qquad \text{EQU. 6}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample ($RV_{(FM\ Sample)}$) to that of the decane peak within the narrow standards calibration ($RV_{(FM\ Calibrated)}$). Any changes in the time of the decane marker peak are then assumed to be related to a linear-shift in flowrate ($\text{Flowrate}_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7 (EQU. 7). Processing of the flow marker peak was done via the PolymerChar GPCOne™ Software. Acceptable flowrate correction is such that the effective flowrate should be within +/−2% of the nominal flowrate.

$$\text{Flowrate}_{(effective)} = \text{Flowrate}_{(nominal)} \times \frac{RV_{(FM\ Calibrated)}}{RV_{(FM\ Sample)}} \qquad \text{EQU. 7}$$

A calibration for the IR5 detector rationing was performed using at least ten ethylene-based polymer standards (polyethylene homopolymer and ethylene/octene copolymers) of known short chain branching (SCB) frequency (measured by the $^{13}$C NMR Method), ranging from homopolymer (0 SCB/1000 total C) to approximately 50 SCB/1000 total C, where total C=carbons in backbone+carbons in branches. Each standard had a weight-average molecular weight (Mw)

of 36,000 g/mole to 126,000 g/mole, as determined by the GPC-LALLS. Each standard had a molecular weight distribution (Mw/Mn) from 2.0 to 2.5, as determined by GPC. Example polymer properties for the Copolymer standards are shown in Table A.

TABLE A

"Copolymer" Standards

| Wt % Comonomer | IR5 Area Ratio | SCB/1000 Total C | Mw | Mw/Mn |
|---|---|---|---|---|
| 23.1 | 0.2411 | 28.9 | 37,300 | 2.22 |
| 14.0 | 0.2152 | 17.5 | 36,000 | 2.19 |
| 0.0 | 0.1809 | 0.0 | 38,400 | 2.20 |
| 35.9 | 0.2708 | 44.9 | 42,200 | 2.18 |
| 5.4 | 0.1959 | 6.8 | 37,400 | 2.16 |
| 8.6 | 0.2043 | 10.8 | 36,800 | 2.20 |
| 39.2 | 0.2770 | 49.0 | 125,600 | 2.22 |
| 1.1 | 0.1810 | 1.4 | 107,000 | 2.09 |
| 14.3 | 0.2161 | 17.9 | 103,600 | 2.20 |
| 9.4 | 0.2031 | 11.8 | 103,200 | 2.26 |

The "IR5 Area Ratio (or "$IR5_{Methyl\ Channel\ Area}/IR5_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "Copolymer" standards. A linear fit of the Wt % Comonomer frequency versus the "IR5 Area Ratio" was constructed in the form of the following Equation 8 (EQU. 8):

$$(\text{Wt. \% Comonomer}) = A_0 + \left[ A_1 \times \left( \frac{IR5_{Methyl\ Channel\ Area}}{IR5_{Measurement\ Channel\ Area}} \right) \right] \quad \text{EQU. 8}$$

End-Group Correction of the wt % Comonomer data can be made via knowledge of the termination mechanism if there is significant spectral overlap with the comonomer termination (methyls) via the molecular weight determined at each chromatographic slice.

Measurement of HDF (High Density Fraction)

Improved comonomer content distribution (iCCD) analysis was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 10 cm (length) by ¼" (ID) (0.635 cm ID) stainless was installed just before IR-5 detector in the detector oven. Ortho-dichlorobenzene (ODCB, 99% anhydrous grade or technical grade) was used. Silica gel 40 (particle size 0.2-0.5 mm, catalogue number 10181-3) from EMD Chemicals was obtained (can be used to dry ODCB solvent before). The CEF instrument is equipped with an autosampler with $N_2$ purging capability. ODCB is sparged with dried nitrogen ($N_2$) for one hour before use. Sample preparation was done with autosampler at 4 mg/mL (unless otherwise specified) under shaking at 160° C. for 1 hour. The injection volume was 300 μL. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length) by ¼" (ID) (0.635 cm) stainless tubing. The column packing and conditioning were with a slurry method according to the reference (Cong, R.; Parrott, A.; Hollis, C.; Cheatham, M. WO2017/040127A1). The final pressure with TCB slurry packing was 150 Bars.

Column temperature calibration was performed by using a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/mL) and Eicosane (2 mg/mL) in ODCB. The iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The modeling of the reported elution peak temperatures as a function of octene mole % using linear regression resulting in the model of Equation 9 (EQU. 9) for which R2 was 0.978.

(Elution Temperature)=−6.3515(Octene Mol %)+101.000  EQU. 9

For the whole resin, integration windows are set to integrate all the chromatograms in the elution temperature (temperature calibration is specified above) range from 23.0° C. to 115° C. The weight percentage of the high density fraction of the resin (HDF) is defined by the following Equation 10 (EQU. 10):

$$HDF = \frac{(\text{integrated area of elution window } 95 - 115° \text{ C.})}{(\text{integrated area of entire elution window } 23 - 115° \text{ C.})} \times 100\% \quad \text{EQU. 10}$$

Catalyst Efficiency

The catalyst efficiency ("Eff") is calculated based on the amount of ethylene consumed during the polymerization per gram of Ti used in the heterogeneous procatalyst (Ethylene (g)/Ti (g)). The grams of Ti refers to the grams of Ti contributed by the titanium species and does not include any Ti contributed by the electron donor compound (the metal-ligand complex).

EXAMPLES

Embodiments of the present disclosure will be further clarified by the following examples. It should be understood that the following examples are intended to be illustrative in nature and do not limit the scope of the preceding disclosure or of the appended claims.

Example A: Preparation of a Preformed Procatalyst Composition for Examples 1-12 and Comparative Examples 1-3

In Example A, a preformed procatalyst composition slurry comprising magnesium chloride, the chlorinating agent, and the titanium species was prepared for use in Examples 1-12 and Comparative Examples 1-3. A 20 wt. % n-butylethylmagnesium solution in heptane was diluted to a concentration of 0.20 M in ISOPAR™ E isoparaffin solvent from ExxonMobile Corporation as the inert hydrocarbon diluent. Hydrochloric acid (HCl) was slowly added to the 0.2 M n-butylethylmagnesium solution under agitation at 30° C. until the Cl/Mg molar ratio reached 2.04 (mol Cl/mol Mg). The temperature of the reaction mixture was maintained at 30° C.±3° C. throughout the reaction. A magnesium chloride ($MgCl_2$) slurry was obtained without separating the $MgCl_2$ solids from the liquid diluent.

A 15% ethylaluminum dichloride (EADC) solution in heptane was slowly added to the $MgCl_2$ slurry at 30° C. with agitation until the EADC/Mg molar ratio reached 0.3 (mol EADC/mol Mg). The temperature of the reaction mixture was maintained at 30° C.±3° C. during the addition. The mixture was allowed to age at 30° C. for 4 hours.

Subsequently, a 51% titanium(IV) isopropoxide solution in heptane was slowly added to the mixture at 30° C. with agitation until the Ti/Mg molar ratio reached 0.075 (mol Ti/mol Mg). The temperature of the reaction mixture was maintained at 30° C.±3° C. during the addition. The mixture was allowed to age again at 30° C. for at least 8 hours. ISOPAR™ E paraffinic solvent was used to adjust the concentration of the procatalyst formulation. The final Ti concentration for the preformed procatalyst composition of Example A was 0.12 M in the hydrocarbon diluent. The preformed procatalyst composition of Example A had a molar ratio of $MgCl_2$ to EADC to Ti (i.e., $MgCl_2$/EADC/Ti) of 40/12/3.

Comparative Examples 1-3: Batch Copolymerization in the Presence of the Catalyst System without the Metal-Ligand Complex as the Donor Compound For Comparative Examples 1, 2, and 3 (CE1, CE2, CE3), batch reactor copolymerization of ethylene monomer and 1-octene comonomer was performed in a stirred one-gallon reactor using the preformed procatalyst composition of Example A as a comparative procatalyst without the metal-ligand complex as the donor compound. The reactor was charged with 250 grams (g) of 1-octene (C8) and 1330 g of ISOPAR™ E isoparaffinic solvent (with a total amount of 1580 g including the 1-octene comonomer and solvent). The reactor was heated to 190° C. and then saturated with ethylene in the presence of 40 millimoles (mmol) of hydrogen.

For CE1, no donor compound comprising a metal-ligand complex was used. An amount of the preformed procatalyst composition prepared in Example A and a cocatalyst solution including triethylaluminum (TEA) were mixed for about 2 min in an overhead shot tank before being injected into the reactor. For CE1, an amount of the preformed procatalyst composition from Example A was added so that the reaction mixture included a titanium loading of 1.5 micromole (μmol) of titanium, and an amount of TEA was added so that the molar ratio of TEA to Ti in the reaction mixture was 10 mol/mol.

For CE2 and CE3, an amount of the preformed procatalyst composition of Example A was added so that the reaction mixture included a titanium loading of 4.0 μmol of titanium, and an amount of TEA was added so that the molar ratio of TEA to Ti in the reaction mixture was 15 mol/mol.

The reactor pressure was maintained at 450 pounds per square inch (psi) (3102.6 kilopascals (kPa), where 1 psi=6.895 kPa) with ethylene flow to compensate ethylene consumption during the polymerization. After 10 minutes of reaction time, the bottom valve of the reactor was opened and the contents of the reactor were transferred to a glass kettle. Afterwards, the mixture was poured onto a Mylar lined pan, cooled, and allowed to stand in a fume hood overnight to remove most of the solvent via evaporation. The ethylene-based polymer of Comparative Examples 1-3 were then dried in a vacuum oven.

The comparative catalyst systems of CE1-CE3 were evaluated for catalyst efficiency (Cat. Eff.), weight average molecular weight (Mw) of the ethylene-based polymer produced, and comonomer weight percent (C8 wt. %) of the ethylene-based polymer produced, according to the test methods described herein, and the results are reported below in Tables 1, 2, and 3, respectively.

Examples 1-3: Batch Copolymerization in the Presence of the Heterogeneous Procatalyst Including Titanium Tetraisopropoxide as the Metal-Ligand Complex Donor Compound For Examples 1-3 (E1, E2, and E3), batch reactor copolymerizations of ethylene monomer and 1-octene comonomer were performed in a stirred one-gallon reactor using a heterogeneous procatalyst prepared by contacting the preformed procatalyst of Example A with a metal-ligand complex donor compound comprising titanium tetraisopropoxide ($Ti(O^iPr)_4$). The reactor was first charged with 250 grams (g) of 1-octene and 1330 g of ISOPAR™ E isoparaffinic solvent (with a total amount of 1580 g including the 1-octene comonomer and solvent). The reactor was heated to 190° C. and then saturated with ethylene in the presence of 40 mmol of hydrogen.

The heterogeneous procatalyst was then prepared by contacting the preformed procatalyst composition from Example A with a metal-ligand complex. For Examples 1-3, $Ti(O^iPr)_4$ was used as the metal-ligand complex donor compound. A solution of $Ti(O^iPr)_4$ in ISOPAR™ E isoparaffinic solvent was added to an amount of the preformed procatalyst composition of Example A. The amounts of the $Ti(O^iPr)_4$ relative to the amount of the titanium species in the preformed procatalyst for each of Examples 1-3 are provided in Table 1 as the molar ratio of Donor/Ti.

For Examples 1 and 2, the Ti(O$^i$Pr)$_4$ solution was added to the preformed procatalyst composition of Example A and mixed for about 2 minutes to prepare the heterogeneous procatalyst. The TEA cocatalyst solution was then added to the heterogeneous procatalyst and the contents were mixed for about 2 minutes. The catalyst system comprising the mixture of the heterogeneous procatalyst and TEA was then injected into the reactor. For Example 3, the Ti(O$^i$Pr)$_4$ donor compound was added to the preformed procatalyst composition of Example A and the mixture was aged for 24 hours to produce the heterogeneous procatalyst. The Ti loading, the molar ratio of TEA to Ti, and the molar ratio of the donor compound to the Ti in the preformed procatalyst of Example A in the catalyst system for each of Examples 1-3 are provided in Table 1. As used throughout the Examples, the Ti Loading refers to the amount of Ti from the titanium species in the preformed procatalyst composition and does not include any Ti added as the metal-ligand complex electron donor compound. Additionally, the molar ratio of TEA to Ti refers to the ratio of the TEA to the Ti from the titanium species of the preformed heterogeneous procatalyst, which does not include Ti added as the metal-ligand complex electron donor compound.

The reactor pressure was maintained at 450 psi (3102.6 kPa) with ethylene flow to compensate ethylene consumption during the copolymerization. After 10 minutes of reaction time, the bottom valve of the reactor was opened and the contents of the reactor were transferred to a glass kettle. Afterwards, the mixture was poured onto a Mylar lined pan, cooled, and allowed to stand in a fume hood overnight to remove most of the solvent via evaporation. The ethylene-based polymer was then dried in a vacuum oven.

The catalyst systems of Examples 1-3 for producing ethylene-based polymers were evaluated for catalyst efficiency (Cat. Eff.), weight average molecular weight (Mw; by GPC) of the ethylene-based polymer produced, and comonomer weight percent (C8 wt. %; by GPC) of the ethylene-based polymer produced, according to test methods described herein, and the results are reported below in Table 1. The Δ(Mw) and Δ(C8 wt. %) in Table 1 are changes in Mw and C8 wt. %, respectively, of each of E1-E3 over Comparative Example CE1.

The results in Table 1 also show that increasing the amount of the donor in E2 compared to E1 increased the Mw and decreased the comonomer content of the ethylene-based polymer of E2 compared to the ethylene-based polymer of E1. Further, the metal-ligand complex (e.g., the Ti(O$^i$Pr)$_4$) can be introduced into the polymerization reaction in various ways. For example, E3 demonstrates that the metal-ligand complex (e.g., the Ti(O$^i$Pr)$_4$) can be incorporated into the heterogeneous procatalyst and aged for a period of time before combining with the cocatalyst just prior to the polymerization reaction. The ethylene-based polymer of E3 exhibited higher Mw and lower comonomer content compared to the polymer produced with the comparative catalyst of CE1 and the polymer produced with E1 where the donor compound contacted with the preformed procatalyst for about 2 minutes.

Examples 4-8: Batch Copolymerization in the Presence of the Heterogeneous Procatalyst Including Vanadium Oxyisopropoxide as the Metal-Ligand Complex Donor Compound For Examples 4-8 (E4, E5, E6, E7, and E8), vanadium oxyisopropoxide (VO(O$^i$Pr)$_3$) was used as the metal-ligand complex donor compound in the heterogeneous procatalyst. The copolymerization reactions of Examples 4-8 were conducted according to the process previously described in relation to Examples 1-3 but with the VO(O$^i$Pr)$_3$ as the metal-ligand complex in place of the Ti(O$^i$Pr)$_4$.

In Examples 4-8, a solution of VO(O$^i$Pr)$_3$ in ISOPAR™ E isoparaffinic solvent was added to the preformed procatalyst composition of Example A to produce the heterogeneous procatalyst. The amounts of the VO(O$^i$Pr)$_3$ relative to the amount of the titanium species in the preformed procatalyst composition of Example A for each of the heterogeneous procatalysts of Examples 4-8 are provided in Table 2 as the molar ratio of Donor/Ti.

For Examples 4-8, the VO(O$^i$Pr)$_3$ solution was added to the preformed procatalyst composition of Example A and mixed for about 2 minutes to produce the heterogeneous procatalyst immediately prior to adding the TEA cocatalyst and injecting the catalyst system into the reactor.

TABLE 1

| | Donor | Ti Load (μmol) | TEA/Ti (mol/mol) | Donor/Ti (mol/mol) | Cat. Eff. (x10$^6$) (g/g Ti) | Mw (Daltons) | Δ(Mw) (%) | C8 wt. % | Δ(C8 wt. %) (%) |
|---|---|---|---|---|---|---|---|---|---|
| CE1 | None | 1.5 | 10 | 0 | 0.68 | 106,714 | — | 8.0 | — |
| E1 | Ti(O$^i$Pr)$_4$ | 3.0 | 10 | 1.2 | 0.36 | 127,431 | 19 | 6.5 | −18 |
| E2 | Ti(O$^i$Pr)$_4$ | 3.0 | 10 | 1.7 | 0.18 | 140,152 | 31 | 5.6 | −30 |
| E3 | Ti(O$^i$Pr)$_4$ | 2.3 | 10 | 1.2 | 0.23 | 132,957 | 25 | 5.9 | −26 |

As shown in Table 1, introduction of the metal-ligand complex Ti(O$^i$Pr)$_4$ as electron donor into the polymerization reaction resulted in significant increases in the Mw of at least 19% for the ethylene-based polymers of E1-E3 compared to the Mw of CE1. Introduction of the Ti(O$^i$Pr)$_4$ as electron donor also resulted in substantial reductions in comonomer content of at least 18% or more in the ethylene-based polymers of E1-E3 compared to the polymer of CE1.

The catalyst systems of Examples 4-8 for producing the ethylene-based polymers were each evaluated for catalyst efficiency (Cat. Eff.), Mw of the ethylene-based polymer produced, and C8 wt. % of the ethylene-based polymer produced, according to test methods described herein. The results for Examples 4-8 and for CE2 are reported below in Table 2. The C8 wt. % was not determined for Example 4. The Δ(Mw) and Δ(C8 wt. %) in Table 2 are calculated as comparisons of each of Examples 4-8 to CE2.

TABLE 2

| | Donor | Ti Load (μmol) | TEA/Ti (mol/mol) | Donor/Ti (mol/mol) | Cat. Eff. (x10$^6$) (g/g Ti) | Mw (Daltons) | Δ(Mw) (%) | C8 wt. % | Δ(C8 wt. %) (%) |
|---|---|---|---|---|---|---|---|---|---|
| CE2 | None | 4.0 | 15 | 0 | 0.46 | 92,955 | — | 7.9 | — |
| E4 | VO(O$^i$Pr)$_3$ | 4.0 | 15 | 1.0 | 0.64 | 97,650 | 5 | — | — |
| E5 | VO(O$^i$Pr)$_3$ | 4.0 | 15 | 1.5 | 0.59 | 112,549 | 21 | 6.6 | −17 |
| E6 | VO(O$^i$Pr)$_3$ | 4.0 | 15 | 2.0 | 0.50 | 125,339 | 35 | 6.0 | −24 |
| E7 | VO(O$^i$Pr)$_3$ | 4.0 | 15 | 2.5 | 0.34 | 134,818 | 45 | 5.3 | −33 |
| E8 | VO(O$^i$Pr)$_3$ | 4.0 | 15 | 3.0 | 0.22 | 140,235 | 51 | 5.2 | −34 |

As shown by the results in Table 2, VO(O$^i$Pr)$_3$ can also be used as an electron donor compound in the catalyst system to increase the Mw and reduce the comonomer content of the ethylene-based polymer made from the catalyst systems. As shown in Table 2, the catalyst systems of E4-E8 each produced an ethylene-based polymers having a Mw that was at least 5% greater than the Mw of the of the ethylene-based polymers of CE2. The catalyst systems of E5-E8 having the VO(O$^i$Pr)$_3$ donor compound also resulted in reduced C8 wt. %. The catalyst systems of E5-E8 produced ethylene-based polymers exhibiting a comonomer weight percent at least 17% less than the comonomer weight percent of the ethylene-based polymers of CE2.

The VO(O$^i$Pr)$_3$ donor compound may also increase catalyst efficiency at low donor/Ti ratios. For example, in E4-E6, the catalyst efficiency was at least 0.50×10$^6$ for VO(O$^i$Pr)$_3$ at a donor/Ti ratio of 2.0 or less, which was higher than the efficiency of the catalyst system of CE2 that did not include the donor compound. The catalyst efficiency of the catalyst systems of E4-E6 having a donor/Ti ratio of 2.0 or less was also substantially greater than the efficiency of the catalyst systems of E1-E3 (Table 1), which had the same donor/Ti ratios but utilized Ti(O$^i$Pr)$_4$ as the donor compound.

Examples 9-12: Batch Copolymerization in the Presence of the Heterogeneous Procatalyst Including Vanadium Oxypropoxide as the Metal-Ligand Complex Donor Compound For Examples 9-12 (E9, E10, E11, and E12), vanadium oxypropoxide (VO(O$^n$Pr)$_3$) was used as the metal-ligand complex donor compound in the heterogeneous procatalyst. The copolymerization reactions of E9-E12 were conducted according to the process previously described in relation to E4-E8 but with the VO(O$^n$Pr)$_3$ as the metal-ligand complex in place of the VO(O$^i$Pr)$_3$. In E9-E12, a solution of VO(O$^n$Pr)$_3$ in ISOPAR™ E isoparaffinic solvent was added to the preformed procatalyst composition of Example A to produce the heterogeneous procatalyst. The amounts of the VO(O$^n$Pr)$_3$ relative to the amount of the titanium species in the heterogeneous procatalyst for each of E9-E12 are provided in Table 3 as the molar ratio of Donor/Ti.

For E9-E12, the VO(O$^n$Pr)$_3$ solution was added to the preformed procatalyst composition of Example A and mixed for about 2 minutes to prepare the heterogeneous procatalyst immediately prior to adding the TEA cocatalyst and injecting the catalyst system into the reactor. The catalyst systems of E9-E12 for producing the ethylene-based polymers were evaluated for catalyst efficiency (Cat. Eff.), Mw of the ethylene-based polymer produced, and C8 wt. % of the ethylene-based polymer produced, according to test methods described herein. The results for E9-E12 and for CE3 are reported below in Table 3. The Δ(Mw) and Δ(C8 wt. %) in Table 3 are calculated as comparisons of each of E9-E12 to CE3.

TABLE 3

| | Donor | Ti Load (μmol) | TEA/Ti (mol/mol) | Donor/Ti (mol/mol) | Cat. Eff. (x10$^6$) (g/g Ti) | Mw (Daltons) | Δ(Mw) (%) | C8 wt. % | Δ(C8 wt. %) (%) |
|---|---|---|---|---|---|---|---|---|---|
| CE3 | None | 4.0 | 15 | 0 | 0.46 | 94,177 | — | 8.1 | — |
| E9 | VO(O$^n$Pr)$_3$ | 4.0 | 15 | 1.0 | 0.60 | 111,955 | 19 | 6.5 | −20 |
| E10 | VO(O$^n$Pr)$_3$ | 4.0 | 15 | 1.5 | 0.38 | 135,348 | 44 | 5.6 | −31 |
| E11 | VO(O$^n$Pr)$_3$ | 4.0 | 15 | 2.0 | 0.27 | 136,837 | 45 | 5.8 | −28 |
| E12 | VO(O$^n$Pr)$_3$ | 4.0 | 15 | 2.5 | 0.13 | 143,115 | 52 | 4.5 | −44 |

The VO(O$^n$Pr)$_3$ may be a more potent electron donor compound than the VO(O$^i$Pr)$_3$ as shown by the greater increases in the Mw and greater reductions in C8 wt. % for the ethylene-based polymers produced with the VO(O$^n$Pr)$_3$ containing heterogeneous procatalyst (E9-E12 in Table 3) compared to the ethylene-based polymers produced with the VO(O$^i$Pr)$_3$ containing heterogeneous procatalyst (E4-E8 in Table 2) at the same donor/Ti ratio. The VO(O$^n$Pr)$_3$ donor compound may also increase catalyst efficiency at low donor/Ti ratios. For example, the catalyst efficiency of the catalyst system of E9 having the VO(O$^n$Pr)$_3$ at a donor/Ti ratio of 1.0 was 0.60×10$^6$, which was substantially greater than the catalyst efficiency of the catalyst system of CE3.

Comparative Example 4: Continuous Copolymerization in the Presence of the Catalyst System without the Metal-Ligand Complex Donor Compound In Comparative Example 4 (CE4), continuous copolymerization of an ethylene-based polymer was made in a continuous solution polymerization process with a comparative catalyst system that did not include the metal-ligand complex donor compound. The continuous solution polymerization process included a reactor that was a liquid full, adiabatic, and continuously stirred tank reactor (CSTR). The reactor included independent control of all solvent, monomer, comonomer, hydrogen, and catalyst system component feeds. The total feed stream to the reactor, which includes the solvent, monomer, comonomer, and hydrogen, was temperature controlled by passing the total feed stream through a heat exchanger before introducing the total feed stream to the reactor. The total feed stream to the reactor was injected into the reactor at one location. The catalyst system components were injected into the reactor separate from the other feeds. An agitator in the reactor was used to continuously mix the reactants. An oil bath provided additional fine tuning of the reactor temperature control.

The ethylene monomer, 1-octene comonomer, and process solvent (SBP 100/140 by Shell Chemicals) were purified with molecular sieves before introduction into the reactor. Hydrogen was dried with a molecular sieve. The feed streams of monomer, solvent, and comonomer were pressurized via mechanical compressors to a pressure greater than the reaction pressure. The monomer, comonomer, solvent, and hydrogen streams were then combined and introduced to the reactor. The individual components of the catalyst system were manually batch diluted with purified solvent/diluent and pressurized to a pressure greater than the reaction pressure. For CE4, the comparative catalyst system included the preformed procatalyst composition of Example A and TEA as the cocatalyst. No metal-ligand complex donor compound was added to the preformed procatalyst composition of Example A for CE4. All reaction feed flows were measured with mass flow meters and independently controlled with metering pumps. The reactor conditions for CE4 are provided below in Table 4.

The final reactor effluent was passed to a zone where the catalyst system was deactivated with the addition of and reaction with water. Following catalyst deactivation, the reactor effluent was passed to a de-volatization system where the ethylene-based polymer was removed from the non-polymer stream (e.g., excess monomer or comonomer, solvent, catalyst, etc.). The non-polymer stream was removed from the system, and the isolated polymer melt was pelletized and collected. The comparative catalyst system of CE4 was evaluated for catalyst efficiency (Cat. Eff.), and the ethylene-based polymer produced in CE4 was evaluated for density, melt index ($I_2$), Mw, and C8 wt. %, according to the test methods described herein. The results for CE4 are provided below in Table 4.

Examples 13 and 14: Continuous Copolymerization in the Presence of the Heterogeneous Procatalyst Including the Metal-Ligand Complex Donor Compound For Examples 13 and 14 (E13 and E14), copolymerizations of ethylene-based polymers were conducted in the continuous solution polymerization process with heterogeneous procatalysts that included the metal-ligand complex donor compound, according to embodiments of the present disclosure. The ethylene-based polymers of E13 and E14 were made according to the solution polymerization process previously described in CE4. For E13 and E14, the metal-ligand complex and the preformed procatalyst composition of Example A were fed to a static mixer and allowed to mix for about 2 minutes to prepare the heterogeneous procatalyst.

For E13, the metal-ligand complex was vanadium oxypropoxide (VO(O$^n$Pr)$_3$), the donor/Ti ratio was 2.32, and the TEA/Ti ratio was 8.00. For E14, the metal-ligand complex used was titanium isopropoxide (Ti(O$^i$Pr)$_4$), the donor/Ti ratio (i.e., ratio of the donor to the Ti from the preformed procatalyst composition of Example A) was 1.70, and the TEA/Ti ratio (i.e., ratio of TEA to the Ti from the preformed procatalyst composition of Example A) was 7.82. The process conditions for E13 and E14 are provided below in Table 4. The catalyst systems of E13 and E14 were evaluated for catalyst efficiency (Cat. Eff.), and the ethylene-based polymers produced in E13 and E14 were evaluated for density, melt index ($I_2$), Mw, and C8 wt. %, according the methods disclosed herein. The results are provided below in Table 4. The Δ(Mw) and Δ(C8 wt. %) in Table 4 are calculated as comparisons of E13 and E14 to CE4.

TABLE 4

| | Example No. | | |
|---|---|---|---|
| | CE4 | E13 | E14 |
| Feed Temperature (° C.) | 20 | 20 | 19 |
| Solvent/Ethylene Mass Flow Ratio (g/g) | 7 | 7 | 7 |
| 1-Octene/Ethylene Mass Flow Ratio (g/g) | 0.10 | 0.10 | 0.10 |
| Hydrogen/Ethylene Mass Flow Ratio (g/g) | $3.52 \times 10^{-5}$ | $3.52 \times 10^{-5}$ | $3.53 \times 10^{-5}$ |
| Reactor Temperature (° C.) | 195 | 195 | 195 |
| Reactor Pressure (kPa) | 3102 | 3102 | 3102 |
| Reactor Ethylene Conversion (%) | 87.8 | 88.0 | 88.0 |
| Metal Ligand Complex Donor | none | VO(O$^n$Pr)$_3$ | Ti(O$^i$Pr)$_4$ |
| Donor/Ti (mol/mol) | 0 | 2.32 | 1.70 |
| TEA/Ti (mol/mol) | 5.00 | 8.00 | 7.82 |
| Cat. Eff. (×10$^6$) | 0.54 | 0.20 | 0.17 |
| Properties of Ethylene-Based Polymer Produced | | | |
| Density (g/cm$^3$) | 0.9411 | 0.9415 | 0.9420 |
| Melt Index | 1.2 | 0.37 | 0.34 |
| Mw (by GPC) (Daltons) | 118247 | 170319 | 169833 |
| Δ(Mw) (%) | — | 44 | 44 |
| C8 wt. % | 1.3 | 0.7 | 0.9 |
| Δ(C8 wt. %) (%) | — | −44 | −35 |

As shown in Table 4, in continuous solution polymerization reactions under similar reaction condition, the inclusion of the metal-ligand complex in the heterogeneous procatalyst, as in E13 and E14, produced ethylene-based polymers having greater Mw and less C8 wt. % compared to ethylene-based polymers produced with the comparative catalyst system of CE4.

Example B: Preparation of a Preformed Heterogeneous Procatalyst Including the Thermally Treated MgCl$_2$ Component for Examples 15-17 and Comparative Example 5

In Example B, a preformed heterogeneous procatalyst incorporating a thermally treated MgCl$_2$ component was synthesized for incorporation into the catalyst systems of Examples 15-18. The MgCl$_2$ component was produced by first synthesizing the MgCl$_2$ particles via reacting butylethylmagnesium in ISOPAR™ E isoparaffin solution with hydrochloride gas to produce a 0.20 M MgCl$_2$ slurry. The MgCl$_2$ slurry was stored and handled in a nitrogen purged glovebox to avoid contamination from moisture and oxygen. A 5.9 liter (L) Parr reactor was used to thermally treat the MgCl$_2$ slurry. 2 L of the MgCl$_2$ slurry was loaded into the reactor via an air-tight designed transferring container, such that the MgCl$_2$ was not exposed to air or moisture. N$_2$ atmosphere was used for reactor line purging and isolation. The reactor was then heated with a heating jacket at 190° C. for 1 hour. The heating of the reactor was controlled by a step controller, with the ramping time of about one hour (from room temperature to 190° C.). After the designated heating time, the reactor was allowed to cool to room temperature in about 3 hours. During the heating process, the contents of the reactor were agitated at 100 rpm. Variations in temperature were controlled to within ±2° C. After the reactor was cooled to room temperature, the slurry comprising the thermally treated $MgCl_2$ was transferred back into the glovebox with the air-tight transferring container to prevent exposure to air and/or moisture.

The slurry containing the thermally treated $MgCl_2$ was then used to produce the preformed heterogeneous procatalyst of Example B. In a $N_2$-purged glovebox, the preformed heterogeneous procatalyst of Example B was produced via sequential addition of ethyl aluminum dichloride (EADC, Aldrich, 1.0 M in hexane) (chlorinating agent) and titanium tetraisopropoxide ($Ti(O^iPr)_4$, Aldrich, 0.125 M in ISOPAR™ E isoparaffinic solvent) (titanium species) to the slurry containing the thermally treated $MgCl_2$ according to the following process. For the preformed heterogeneous procatalyst of Example B, 10 milliliters (mL) of the thermally treated $MgCl_2$ slurry was maintained under constant stirring in a capped glass vial. On the first day, 0.301 mL of the 1.0 M EADC solution was added to the thermally treated $MgCl_2$ slurry, and the resulting slurry including the thermally treated $MgCl_2$ component and the EADC was left stirring overnight. On the second day, 0.603 mL of the 0.125 M $Ti(O^iPr)_4$ solution was added, and the resulting slurry was left stirring overnight. The preformed heterogeneous procatalyst of Example B was ready for use on the third day. The preformed heterogeneous procatalyst of Example B included a molar ratio of EADC to $MgCl_2$ of 6:40 (i.e., 6 moles EADC for every 40 moles $MgCl_2$) and a molar ratio of Ti to $MgCl_2$ of 1.5:40 (i.e., 1.5 moles of $Ti(O^iPr)_4$ for every 40 moles of $MgCl_2$).

Example C: Preparation of a Comparative Preformed Procatalyst with Non-Thermally Treated $MgCl_2$ for Comparative Examples 5-9

The comparative preformed procatalyst of Example C was produced without thermally treating the $MgCl_2$. The comparative preformed procatalyst of Example C was produced by first synthesizing the $MgCl_2$ particles via reacting butylethylmagnesium in ISOPAR™ E solution with hydrochloride gas to produce a 0.20 M $MgCl_2$ slurry. The $MgCl_2$ slurry was stored and handled in a nitrogen purged glovebox to avoid contamination from moisture and oxygen. The $MgCl_2$ slurry was not thermally treated.

In a $N_2$-purged glovebox, the comparative preformed procatalyst of Example C was produced via sequential addition of ethyl aluminum dichloride (EADC, Aldrich, 1.0 M in hexane) (chlorinating agent) and titanium tetraisopropoxide ($Ti(O^iPr)_4$, Aldrich, 0.125 M in ISOPAR™ E isoparaffinic solvent) (titanium species) to the $MgCl_2$ slurry according to the following process. For the comparative preformed procatalyst of Example C, 10 milliliters (mL) of the $MgCl_2$ slurry (non-thermally treated) was maintained under constant stirring in a capped glass vial.

On the first day, 0.600 mL of the 1.0 M EADC solution was added to the $MgCl_2$ slurry, and the resulting slurry including the $MgCl_2$ component and the EADC was left stirring overnight. On the second day, 1.199 mL of the 0.125 M $Ti(O^iPr)_4$ solution was added, and the resulting slurry was left stirring overnight. The comparative preformed procatalyst of Example C was ready for use on the third day. The comparative preformed procatalyst of Example C included a molar ratio of EADC to $MgCl_2$ of 12:40 (i.e., 12 moles EADC for every 40 moles $MgCl_2$) and a molar ratio of Ti to $MgCl_2$ of 3.0:40 (i.e., 3 moles of $Ti(O^iPr)_4$ for every 40 moles of $MgCl_2$).

Examples 15-18: Batch Copolymerization in the Presence of the Heterogeneous Procatalyst Produced from the Preformed Heterogeneous Procatalyst of Example B For Examples 15-17 (E15, E16, and E17), batch copolymerizations of ethylene and 1-octene were conducted in the presence of a heterogeneous procatalyst comprising the preformed heterogeneous procatalyst of Example B having the thermally treated $MgCl_2$ and a metal ligand complex donor compound. The batch copolymerizations were conducted in a 2 L Parr batch reactor. The reactor was heated by an electrical heating mantle and cooled by an internal serpentine cooling coil using water. The bottom of the reactor was fitted with a dump valve for emptying the reactor contents into a stainless steel dump pot pre-filled with a catalyst kill solution (e.g., 5 mL mixture of IRGAFOS® organophosphite processing stabilizer from BASF, IRGANOX® antioxidant from BASF, and toluene). The dump pot was vented to a blow down tank under continuous $N_2$ purge. All solvents used for the copolymerization or catalyst makeup were run through purification columns, to remove impurities. The solvents were passed through 2 columns: the first containing A2 alumina and the second containing reduced copper on alumina (Q5 reactant). The ethylene was passed through 2 columns: the first containing A204 alumina and 4 Å molecular sieves, the second containing Q5 reactant. The $N_2$ was passed through a single column containing A204 alumina, 4 Å molecular sieves, and Q5 reactant. The reactor was loaded first with 664 g ISOPAR™ E solvent and 134±2 g 1-octene from a separate tank, which was filled to the load set points on an Ashcroft differential pressure cell. Then, 14.8±0.3 mmol hydrogen was added after solvent addition and the reactor was heated to 190° C. Then, 56±1 g ethylene was then added to the reactor when at the reaction temperature to reach reaction pressure (i.e., 475 psi). Further ethylene addition amounts during the polymerization reaction were monitored by a micro-motion flow meter.

The preformed heterogeneous procatalyst of Example B and the metal-ligand complex solution in a hydrocarbon diluent were pipetted into a glass 5 mL vial to produce the heterogeneous procatalysts of E15-E17. For E15, the heterogeneous procatalyst included 1 molar equivalent of vanadium oxypropoxide ($VO(O^nPr)_3$) as the metal-ligand complex. For E16, the heterogeneous procatalyst included 2 molar equivalents of ($VO(O^nPr)_3$) as the metal-ligand complex. For E17, the heterogeneous procatalyst included 3 molar equivalents of titanium tetraisopropoxide ($Ti(O^iPr)_4$) as the metal-ligand complex.

For each of E15-E17, the heterogeneous procatalyst was then taken up in a 20 mL syringe with an 18 gauge needle. The vial was rinsed with solvent and the rinses were also taken into the syringe. A double-ended septa sealed vial was used to cap the syringe for transportation outside the glovebox to the batch reactor.

The cocatalyst solution of TEA in a solvent was taken up in a separate syringe. The catalyst system solutions (heterogeneous procatalyst, and the TEA) were in separate syringes and injected within several minutes of being prepared. The heterogeneous procatalyst was prepared second but injected first, and the TEA solution was rinsed three times (2.5, 2.5, 5 mL).

The catalyst system components were injected into a shot tank attached to the reactor under the flow of $N_2$. The mixture of the two solutions was maintained in the shot tank for 5 minutes, and then introduced to the reactor under a 150 psi differential pressure after the reactor set points were achieved. The amounts of the metal-ligand complex donor compound and the TEA cocatalyst were set based on the amount of Ti present in the preformed heterogeneous procatalyst of Example B (i.e., 1.4 μmol), and are provided below in Table 5.

After injection of the catalyst system, the reaction was initiated to produce the ethylene-based polymers. The reaction mixture was collected for analysis in a stainless steel pan for solvent removal. The reactor was washed twice with 850 g of ISOPAR™ E solvent at a temperature between 140° C. and 160° C. The first wash was collected and combined with the reaction mixture. The ethylene-based polymer samples from each example were air dried overnight to remove the majority of solvent and then placed in a vacuum oven under $N_2$ to further remove trapped solvent. The vacuum oven was designed to do the following: cycle three times between 5 minutes nitrogen flow and vacuum to 40 Torr, ramp temperature 1° C./min to 80° C. and hold for three hours under vacuum, then ramp to 140° C. and hold for 4 hours. The cooled ethylene-based polymers of E15-E17 were then analyzed for Mw, melt index $I_2$, weight percent of high density fraction (HDF wt. %), and C8 wt. % according to the test methods described herein. The results are provided below in Table 5.

Comparative Examples 5 and 6: Batch Copolymerization in the Presence of the Preformed Heterogeneous Procatalysts of Example C and Example B For Comparative Examples 5 and 6 (CE5 and CE6), batch copolymerizations of ethylene and 1-octene were conducted using the preformed procatalysts without the metal ligand complex. For CE5, the copolyerization was conducted using the preformed heterogeneous procatalyst of Example B having the thermally treated $MgCl_2$. For CE6, the copolymerization was conducted with the comparative preformed procatalyst of Example C that included $MgCl_2$ that was not thermally treated. The batch copolymerizations of CE5 and CE6 were conducted according to the process previously described in E15-E17. In CE5 and CE6, no metal-ligand complex was added to preformed procatalysts. For each of CE5 and CE6, the preformed procatalyst was injected into the shot tank without adding a metal-ligand complex as a donor compound. The ethylene-based polymers of CE5 and CE6 were collected and evaluated for Mw, melt index $I_2$, HDF, and C8 wt. %, according to the test methods described herein. The results are presented in Table 5.

Comparison of Examples 15-17 (E15-E17) with Comparative Examples 5 and 6 (CE5 and CE6)

The composition parameters of the catalyst systems for E15-17, CE5, and CE6 and the Mw, $I_2$, HDF, and C8 wt. % of the ethylene-based polymers produced in E15-17, CE5, and CE6 are provided below in Table 5. The Δ(Mw), Δ(HDF), and Δ(C8 wt. %) in Table 5 are calculated as comparisons of each of E15-E17 and CE5 to CE6. In Table 5, The Ti Loading in the reactor refers to the amount of Ti associated with the preformed procatalyst and does not include any amount of Ti contributed by the electron donor compound.

TABLE 5

Comparison of Ethylene-Based Polymers of E15-E17 with the Ethylene-Based Polymer of CE5 and CE6

| | Sample ID | | | | |
|---|---|---|---|---|---|
| | E15 | E16 | E17 | CE5 | CE6 |
| Preformed Heterogeneous Procatalyst | Example B | Example B | Example B | Example B | Example C |
| Metal-Ligand Complex Donor | VO(O"Pr)$_3$ | VO(O"Pr)$_3$ | Ti(O$^i$Pr)$_4$ | — | — |
| Ti Loading (μmol) | 1.40 | 1.40 | 1.40 | 1.40 | 1.40 |
| Donor/Ti (mol/mol) | 1 | 2 | 3 | — | — |
| TEA/Ti (mol/mol) | 15 | 15 | 15 | 8 | 8 |
| Mw (Daltons) | 132370 | 142570 | 138325 | 125672 | 100301 |
| Δ(Mw) (%) | 32 | 42 | 38 | 25 | — |
| Melt Index $I_2$ | 0.64 | 0.52 | 0.57 | 1.02 | 1.80 |
| HDF (wt. %) | 43.91 | 47.75 | 47.22 | 36.44 | 13.98 |
| Δ(HDF) (%) | 214 | 242 | 238 | 161 | — |
| C8 wt. % | 5.08 | 4.38 | 4.77 | 6.51 | 9.10 |
| Δ(C8 wt. %) (%) | −44 | −52 | −48 | −28 | — |

The comparison between CE5 and CE6 demonstrates that polymerization in the presence of a preformed procatalyst that includes the thermally treated $MgCl_2$, such as the preformed heterogeneous procatalyst of Example B used in CE5, can produce an ethylene-based polymer exhibiting greater Mw, greater HDF, reduced melt index ($I_2$), and reduced comonomer content (C8 wt. %) compared to the ethylene-based polymers produced in the presence of a comparative preformed procatalyst with non-thermally-treated $MgCl_2$, (e.g., comparative preformed procatalyst of Example C used in CE6). For example, even though the catalyst system CE5 had a lower Ti/Mg molar ratio than the catalyst system CE6 (0.0375 vs. 0.075), the ethylene-based polymer of CE5 exhibited a 25% increase in Mw, a 161% increase in HDF, a 43% reduction in the $I_2$, and a 28% reduction in C8 wt. % compared to the ethylene-based polymer of CE6. For Ziegler-Natta catalysts, a catalyst containing a lower level of Ti is normally expected to produce a (co)polymer with lower Mw, lower HDF, higher $I_2$, and higher C8 wt. %.

The comparison of E15 and E16 to CE5 demonstrates that including the VO(O"Pr)$_3$ metal-ligand complex as the donor compound in the heterogeneous procatalyst can further increase the Mw and HDF and reduce the $I_2$ and C8 wt. % of the ethylene-based polymers compared to ethylene-based polymers produced with the preformed heterogeneous procatalyst of Example B without the metal-ligand complex donor compound. A comparison of E15 to E16 demonstrates that a greater molar ratio of VO(O"Pr)$_3$ metal-ligand complex to the titanium species in the heterogeneous procatalyst (i.e., the Donor/Ti molar ratio) may further increase the Mw and HDF and decrease the $I_2$ and C8 wt. % of the resulting ethylene-based polymers. Comparing E17 to CE5 demonstrates that the use of Ti(O$^i$Pr)$_4$ metal-ligand complex as the donor compound in combination with the thermally-treated $MgCl_2$ in the heterogeneous procatalyst can also increase the Mw and HDF and decrease the $I_2$ and C8 wt. % of the ethylene-based polymers (E17) compared to the ethylene-based polymers produced without including the Ti(O$^i$Pr)$_4$ metal-ligand complex as the donor compound in the preformed heterogeneous procatalyst (CE5).

Example D: Preparation of a Preformed Heterogeneous Procatalyst Including the Thermally Treated MgCl$_2$ Component for Examples 18 and 19

In Example D, a preformed heterogeneous procatalyst incorporating a thermally treated MgCl$_2$ component was synthesized for incorporation into the catalyst systems of Examples 18 and 19. The preformed heterogeneous procatalyst of Example D was produced according to the process previously described in Example B. The relative amounts of the thermally treated MgCl$_2$ slurry, EADC, and Ti(O$^i$Pr)$_4$ were modified so that the heterogeneous procatalyst of Example D had a molar ratio of thermally-treated MgCl$_2$ to EADC to Ti(O$^i$Pr)$_4$ of 40:12:3 (i.e., 12 moles EADC for every 40 moles MgCl$_2$ and 3.0 moles of Ti(O$^i$Pr)$_4$ for every 40 moles of MgCl$_2$).

Example E: Preparation of a Preformed Heterogeneous Procatalyst Including the Thermally Treated MgCl$_2$ Component for Examples 20 and 21

In Example E, a preformed heterogeneous procatalyst incorporating a thermally treated MgCl$_2$ component was synthesized for incorporation into the catalyst systems of Examples 20 and 21. The preformed heterogeneous procatalyst of Example E was produced according to the process previously described in Example B. The relative amounts of the thermally treated MgCl$_2$ slurry, EADC, and Ti(O$^i$Pr)$_4$ were modified so that the preformed heterogeneous procatalyst of Example E had a molar ratio of thermally-treated MgCl$_2$ to EADC to Ti(O$^i$Pr)$_4$ of 40:6.8:1.7 (i.e., 6.8 moles EADC for every 40 moles MgCl$_2$ and 1.7 moles of Ti(O$^i$Pr)$_4$ for every 40 moles of MgCl$_2$).

Examples 18-21: Batch Copolymerization in the Presence of a Heterogeneous Procatalyst Including a Metal-Ligand Complex Donor Compound For Examples 18-21 (E18, E19, E20, and E21), batch copolymerizations of ethylene and 1-octene were conducted in the presence of catalyst systems that included one of the preformed heterogeneous procatalysts of Examples D or E to which a metal-ligand complex as a donor compound was added. For each of E18, E19, E20, and E21, the metal-ligand complex donor compound and the starting preformed heterogeneous procatalyst are provided below in Table 6. The molar ratios of the metal-ligand complex to the Ti in the preformed heterogeneous procatalyst in the catalyst system for E18-E21 are also provided below in Table 6. For E18-E21, the molar ratio of TEA to the Ti in the preformed procatalyst was 15:1.

For E18-E21, the batch copolymerizations of ethylene and 1-octene were performed in a one-gallon stirred reactor, which was charged with 250 g of 1-octene and 1330 g of ISPOAR™ E isoparaffinic solvent, for a total amount charged of 1580 g. The reactor was heated to 190° C. and then saturated with ethylene in the presence of 40 mmol of hydrogen. The heterogeneous procatalyst was prepared by adding the metal-ligand complex to the preformed heterogeneous procatalyst of Example D or Example E and mixing for 2 minutes.

For E18 and E20, titanium tetraisopropoxide (Ti(O$^i$Pr)$_4$) was used as the metal-ligand complex. For E19 and E21, vanadium oxybutoxide (VO(O$^n$Bu)$_3$) was used as the metal-ligand complex. The molar ratios of the metal-ligand complex to Ti from the preformed heterogeneous procatalyst in the catalyst system for each of E18-E21 are provided below in Table 6.

The heterogeneous procatalyst (including the metal-ligand complex) and TEA cocatalyst solution were separately taken up into syringes and injected into an overhead shot tank as previously described in E15-E17. For each example, the catalyst system, which included the heterogeneous procatalyst and TEA cocatalyst, was mixed for about 2 min in the shot tank before being injected into the reactor. The reactor pressure was maintained at 450 psi (3102 kPa) with ethylene flow to compensate ethylene consumption during the polymerization. After 10 minutes of reaction time, the bottom valve of the reactor was opened and the contents transferred to a glass kettle. The mixture was poured from the glass kettle onto a Mylar lined pan, cooled, and allowed to stand in a fume hood overnight to remove most of the solvent via evaporation. The resulting ethylene-based polymers were then dried in a vacuum oven.

Examples 22-23: Batch Copolymerization in the Presence of the Preformed Heterogeneous Procatalyst of Example C in Combination with a Metal-Ligand Complex Donor Compound For Examples 22-23 (E22 and E23, batch copolymerizations of ethylene and 1-octene were conducted in the presence of heterogeneous procatalysts that included a metal-ligand complex as a donor compound added to the preformed heterogeneous procatalysts of Examples C, which included MgCl$_2$ that was not thermally treated. For E22, titanium tetraisopropoxide (Ti(O$^i$Pr)$_4$) was added as the metal-ligand complex. For E23, vanadium oxybutoxide (VO (O$^n$Bu)$_3$) was added as the metal-ligand complex. The molar ratios of the metal-ligand complex to Ti (from the preformed heterogeneous procatalyst) in the catalyst system for E22 and E23 are provided below in Table 6. The co-polymerizations of E22 and E23 were conducted according to the process previously described in E18-E21.

Comparative Examples 7 and 8: Batch Copolymerization in the Presence of the Preformed Heterogeneous Procatalyst of Examples D and E without the Metal-Ligand Complex Donor Compound For Comparative Examples 7 and 8 (CE7 and CE8), batch copolymerizations of ethylene and 1-octene were conducted in the presence of catalyst systems that included one of the preformed heterogeneous procatalysts of Examples D or E having the thermally treated MgCl$_2$. The copolymerizations for CE7 and CE8 were conducted without addition of a metal-ligand complex to the catalyst system. The copolymerization of CE7 was conducted with the preformed heterogeneous procatalyst of Example D, and the copolymerization of CE8 was conducted with the preformed heterogeneous procatalyst of Example E. The copolymerizations for CE7 and CE8 were conducted according to the process described above in E18-E21 except that the metal-ligand complex was not included in the heterogeneous procatalyst.

Comparative Example 9: Batch Copolymerization in the Presence of the Preformed Heterogeneous Procatalyst of Example C For Comparative Example 9 (CE9), batch copolymerization of ethylene and 1-octene was conducted in the presence of a catalyst system that included a comparative preformed procatalyst comprising the preformed procatalyst composition of Example C, which did not have the thermally treated MgCl$_2$. The copolymerization for CE9 was conducted without addition of a metal-ligand complex to the procatalyst. The copolymerization for CE9 was conducted according to the process described above in E18-E21 except that the metal-ligand complex was not included in the heterogeneous procatalyst.

Evaluation and Comparison of the Ethylene-Based Polymers of Examples E18-E23 and Comparative Examples CE7-CE9

The ethylene-based polymers collected from the co-polymerizations of E18-E23 and CE7-CE9 were evaluated for Mw, C8 wt. %, and HDF, according to the test methods described herein, and the results are presented below in Table 6. The Δ(Mw), Δ(C8 wt. %), and Δ(HDF) for E18, E19, E20, E21, E22, E23, CE7, and CE8 in Table 6 were calculated as the change from CE9.

TABLE 6

| | Donor | Preformed Procatalyst | Ti Loading (μmol) | Donor/ Ti (mol/ mol) | Mw (Dalton) | Δ(Mw) (%) | C8 wt. % | Δ(C8 wt. %) | HDF (wt. %) | Δ(HDF) (%) |
|---|---|---|---|---|---|---|---|---|---|---|
| E18 | Ti(O$^i$Pr)$_4$ | D | 6 | 1.7 | 125151 | 66 | 5.12 | −42 | 34.30 | 182 |
| E19 | VO(O$^n$Bu)$_3$ | D | 6 | 2.0 | 132120 | 76 | 5.83 | −34 | 32.38 | 167 |
| E20 | Ti(O$^i$Pr)$_4$ | E | 6 | 1.7 | 127243 | 69 | 6.49 | −26 | 31.97 | 163 |
| E21 | VO(O$^n$Bu)$_3$ | E | 3.5 | 2.0 | 127144 | 69 | 6.72 | −24 | 24.61 | 103 |
| E22 | Ti(O$^i$Pr)4 | C | 6 | 1.7 | 92626 | 23 | 754 | −14 | 24.71 | 103 |
| E23 | VO(O$^n$Bu)$_3$ | C | 6 | 2.0 | 118585 | 58 | 6.88 | −22 | 30.70 | 153 |
| CE7 | — | D | 4.7 | — | 103212 | 37 | 7.56 | −14 | 23.67 | 95 |
| CE8 | — | E | 2.8 | — | 98244 | 31 | 7.92 | −10 | 17.97 | 48 |
| CE9 | — | C | 2.7 | — | 75201 | — | 8.79 | — | 12.15 | — |

The comparison of the ethylene-based polymers of CE7, CE8, and CE9 demonstrates that producing the ethylene-based polymer in the presence of a preformed heterogeneous procatalyst that includes the thermally treated MgCl$_2$ (CE7 and CE8) may increase the Mw, increase the HDF, and decrease the C8 wt. % of the ethylene-based polymers compared to ethylene-based polymers prepared with comparative preformed procatalysts that do not include the thermally treated MgCl$_2$ (CE9).

Comparison of the ethylene-based polymers of E22 and E23 with the ethylene-based polymer of CE9 demonstrates that including a metal-ligand complex as a donor compound in the heterogeneous procatalyst (E22 and E23) may increase the Mw, increase the HDF wt. %, and decrease the C8 wt. % of the ethylene-based polymers compared to ethylene-based polymers prepared with comparative procatalysts that do not include the metal-ligand complex as the donor compound (CE9) under the same reactor process conditions. An increase in Mw and HDF wt. % and decrease in C8 wt. % of the ethylene-based polymers can be achieved by including a metal-ligand complex as a donor compound in the heterogeneous procatalyst without thermally treating the MgCl$_2$ component.

Comparison of the ethylene-based polymers of E18, E22, CE7, and CE9 demonstrates that the heterogeneous procatalyst having the thermally treated MgCl$_2$ in combination with Ti(O$^i$Pr)$_4$ as the metal-ligand complex donor compound (E18) produces ethylene-based polymers having greater Mw, greater HDF wt. %, and reduced C8 wt. % compared to the ethylene-based polymer of CE9 as well as the ethylene-based polymers of E22 (Ti(O$^i$Pr)$_4$ metal-ligand complex but no thermally treated MgCl$_2$) and CE7 (thermally treated MgCl$_2$ but no metal-ligand complex donor compound). Thus, the inclusion of both the thermally treated MgCl$_2$ and the metal-ligand complex into the heterogeneous procatalyst may provide greater increases in Mw and HDF wt. % and greater decrease in C8 wt. % of the ethylene-based polymers compared to including either the thermally treated MgCl$_2$ or the metal-ligand complex, but not both, into the heterogeneous procatalyst. In E20, ethylene-based polymers were produced in the presence of a heterogeneous catalyst based on the preformed procatalyst of Example E, which had lesser contents of EADC and Ti (MgCl$_2$/EADC/Ti of 40/6.8/1.7) compared to the preformed procatalyst of Example D (MgCl$_2$/EADC/Ti of 40/12/3), which was used in E18. Comparison of the ethylene-based polymers of E20, E22, CE8 and CE9 demonstrates that the increases in Mw and HDF and decrease in C8 wt. % of the ethylene-based polymers can be achieved by including the thermally treated MgCl$_2$ in combination with the Ti(O$^i$Pr)$_4$ metal-ligand complex even when the heterogeneous procatalyst is formulated with lower amounts of the EADC (chlorinating agent) and Ti (titanium species).

Comparison of the ethylene-based polymers of E19, E23, CE7, and CE9 demonstrates that the heterogeneous procatalyst that includes thermally treated MgCl$_2$ in combination with VO(O$^n$Bu)$_3$ as the metal-ligand complex donor compound (E19) produces ethylene-based polymers having greater Mw, greater HDF wt. %, and reduced C8 wt. % compared to the ethylene-based polymer of CE9 as well as the ethylene-based polymers of E23 (VO(O$^n$Bu)$_3$ metal-ligand complex but no thermally treated MgCl$_2$) and CE7 (thermally treated MgCl$_2$ but no metal-ligand complex donor compound). In E21, ethylene-based polymers were produced in the presence of the heterogeneous catalyst that included the preformed procatalyst of Example E, which had reduced molar ratios of EADC and Ti (MgCl$_2$/EADC/Ti of 40/6.8/1.7) compared to the preformed procatalyst of Example D (MgCl$_2$/EADC/Ti of 40/12/3), which was used in E19. Comparison of the ethylene-based polymers of E21, E23, CE8, and CE9 demonstrates that the increases in Mw and HDF and decrease in C8 wt. % of the ethylene-based polymers can be achieved by including the thermally treated MgCl$_2$ in combination with the VO(O$^n$Bu)$_3$ metal-ligand complex even when the heterogeneous procatalyst is formulated with lower amounts of the EADC and Ti.

In a first aspect of the present disclosure, a heterogeneous procatalyst may comprise a titanium species, a preformed MgCl$_2$ support with a specific surface area of at least 100 m$^2$/g, a chlorinating agent, and a metal-ligand complex. The chlorinating agent may have a structural formula $Al(Cl)_x(R^1)_{3-x}$ or $Si(Cl)_y(R^1)_{4-y}$, where $R^1$ is a $(C_1$-$C_{30})$ hydrocarbyl, x is 1, 2, or 3, and y is 1, 2, 3, or 4. The metal-ligand complex may have a structural formula $(L)_nM(Y)_m(XR^2)_b$, where M is a metal cation; each L is a neutral ligand or (=O); each Y is a halide or $(C_1$-$C_{20})$alkyl; each $XR^2$ is an anionic ligand in which X is a heteroatom or a heteroatom-containing functional group and $R^2$ is $(C_1$-$C_{20})$hydrocarbyl or $(C_1$-$C_{20})$ heterohydrocarbyl; n is 0, 1, or 2; m is 0, 1, 2, 3, or 4; b is 1, 2, 3, 4, 5, or 6; and the metal-ligand complex is overall charge neutral.

A second aspect of the present disclosure may include the first aspect, wherein the chlorinating agent is chosen from ethylaluminum dichloride, diethylaluminum chloride, ethylaluminum sesquichloride, isobutylaluminum dichloride, diisobutylaluminum chloride, and combinations thereof.

A third aspect of the present disclosure may include either the first or second aspect, wherein the titanium species is $TiCl_{4-c}(OR^3)_c$ or $TiCl_{3-d}(OR^3)_d$, wherein $R^3$ is $(C_1$-$C_{20})$ hydrocarbyl, c is 0, 1, 2, 3, or 4, and d is 0, 1, 2, or 3.

A fourth aspect of the present disclosure may include the third aspect, wherein the molar ratio of the total amount of chlorine in the chlorinating agent to the sum of the amounts of $OR^3$ and $XR^2$ in the heterogeneous procatalyst is from 0.33 to 1.45.

A fifth aspect of the present disclosure may include any of the first through fourth aspects, wherein the titanium species is chosen from $TiCl_4$, $TiCl_3$, $TiCl_2(OC_2H_5)_2$, $TiCl_2(O$-i-$C_3H_7)_2$, $TiCl_2(O$-n-$C_4H_9)_2$, $TiCl_2(O$-i-$C_4H_9)_2$, $TiCl(O$-i-$C_3H_7)_3$, $TiCl(O$-n-$C_4H_9)_3$, $TiCl(O$-i-$C_4H_9)_3$, $Ti(OC_2H_5)_4$, $Ti(O$-i-$C_3H_7)_4$, $Ti(O$-n-$C_4H_9)_4$, $Ti(O$-i-$C_4H_9)_4$, and $Ti(OCH_2CH(C_2H_5)(C_4H_9))_4$.

A sixth aspect of the present disclosure may include any of the first through fifth aspects, wherein the $MgCl_2$ support is a reaction product of an alkylmagnesium compound solution in a hydrocarbon diluent and a chloride source without separation of the hydrocarbon diluent.

A seventh aspect of the present disclosure may include the sixth aspect, wherein the metal-ligand complex is at least partially soluble in the hydrocarbon diluent of the $MgCl_2$ support.

An eighth aspect of the present disclosure may include any of the first through seventh aspects, wherein a molar ratio of the chlorinating agent to $MgCl_2$ in the heterogeneous procatalyst is from 0.05:1 to 2:1.

A ninth aspect of the present disclosure may include any of the first through eighth aspects, wherein a molar ratio of the titanium species to $MgCl_2$ in the heterogeneous procatalyst is from 0.005:1 to 0.25:1.

In a tenth aspect of the present disclosure, a heterogeneous procatalyst may comprise a preformed heterogeneous procatalyst comprising a titanium species and a $MgCl_2$ support. The heterogeneous procatalyst may further include a metal-ligand complex having a structural formula $(L)_nM(Y)_m(XR^2)_b$, where M is a metal cation; each L is a neutral ligand or (=O); each Y is a halide or $(C_1$-$C_{20})$alkyl; each $XR^2$ is an anionic ligand in which X is a heteroatom or a heteroatom-containing functional group and $R^2$ is $(C_1$-$C_{20})$ hydrocarbyl or $(C_1$-$C_{20})$heterohydrocarbyl; n is 0, 1, or 2; m is 0, 1, 2, 3, or 4; b is 1, 2, 3, 4, 5, or 6; and the metal-ligand complex is overall charge neutral.

An eleventh aspect of the present disclosure may include any of the first through tenth aspects, wherein the metal-ligand complex is a metal alkoxide having structural formula $M(OR^2)_e$, wherein e is 2, 3, 4, 5, or 6.

A twelfth aspect of the present disclosure may include any of the first through tenth aspects, wherein the metal-ligand complex is a metal oxyalkoxide having structural formula $M(=O)(OR^2)_f$, wherein f is 1, 2, 3, or 4.

A thirteenth aspect of the present disclosure may include any of the first through twelfth aspects, wherein M is a transition metal cation.

A fourteenth aspect of the present disclosure may include any of the first through twelfth aspects, wherein M is a main group metal cation.

A fifteenth aspect of the present disclosure may include any of the first through twelfth aspects, wherein M is vanadium, titanium, scandium, zirconium, niobium, magnesium, or calcium.

A sixteenth aspect of the present disclosure may include any of the first through thirteenth aspects, wherein the metal-ligand complex comprises at least one of vanadium (V) oxytripropoxide, vanadium(V) oxytributoxide, vanadium(V) oxytriisopropoxide, titanium(IV) isopropoxide, titanium(IV) ethoxide, or combinations thereof.

A seventeenth aspect of the present disclosure may include any of the first through sixteenth aspects, wherein the procatalyst further comprises an additional transition metal compound.

An eighteenth aspect of the present disclosure may include the seventeenth aspect, wherein the additional transition metal compound may be independently chosen from zirconium, hafnium, vanadium, and chromium.

A nineteenth aspect of the present disclosure may include any of the first through eighteenth aspects, wherein the heterogeneous procatalyst may be prepared by a process comprising thermally treating magnesium chloride at a temperature greater than 100° C. and a treatment time of at least 30 minutes to form the magnesium chloride component, then contacting the magnesium chloride component with the titanium species.

A twentieth aspect of the present disclosure may include any of the first through nineteenth aspects and is directed to a catalyst system for olefin polymerization that may include the heterogeneous procatalyst of any of the first through nineteenth aspects and a cocatalyst comprising an organoaluminum compound.

In a twenty-first aspect of the present disclosure, a catalyst system for olefin polymerization may include a preformed heterogeneous procatalyst comprising a titanium species and a $MgCl_2$ support. The catalyst system may further include a metal-ligand complex having a structural formula $(L)_nM(Y)_m(XR^2)_b$, where M is a metal cation; each L is a neutral ligand or (=O); each Y is a halide or $(C_1$-$C_{20})$alkyl; each $XR^2$ is an anionic ligand in which X is a heteroatom or a heteroatom-containing functional group and $R^2$ is $(C_1$-$C_{20})$ hydrocarbyl or $(C_1$-$C_{20})$heterohydrocarbyl; n is 0, 1, or 2; m is 0, 1, 2, 3, or 4; b is 1, 2, 3, 4, 5, or 6; and the metal-ligand complex is overall charge neutral. The catalyst system may further include a cocatalyst comprising an organoaluminum compound.

A twenty-second aspect of the present disclosure may include the twenty-first aspect, wherein the cocatalyst is chosen from an alkyl aluminum, a haloalkylaluminum, an alkylaluminum halide, and combinations thereof.

A twenty-third aspect of the present disclosure may include any of the twentieth through twenty-second aspects, in which a polymerization process may include contacting ethylene and optionally one or more α-olefin comonomers with a catalyst system according to any one of the twentieth through twenty-second aspects.

A twenty-fourth aspect of the present disclosure may include the twenty-third aspect, wherein the polymerization process is a solution polymerization process.

In a twenty-fifth aspect of the present disclosure, a process for preparing a heterogeneous procatalyst may include contacting a magnesium chloride component with a chlorinating agent, a titanium species, and a metal-ligand complex. The magnesium chloride component may be a preformed $MgCl_2$ support with specific surface area of at least 100 m$^2$/g. The chlorinating agent may have a structural formula $Al(Cl)_x(R^1)_{3-x}$ or $Si(Cl)_y(R^1)_{4-y}$, where: $R^1$ is a $(C_1-C_{30})$ hydrocarbyl; x is 1, 2, or 3; and y is 1, 2, 3, or 4. The metal-ligand complex may have a structural formula $(L)_nM(Y)_m(XR^2)_b$, where: M is a metal cation; each L is a neutral ligand or (=O); each Y is a halide or $(C_1-C_{20})$alkyl; each $XR^2$ is an anionic ligand in which X is a heteroatom or a heteroatom-containing functional group and $R^2$ is $(C_1-C_{20})$hydrocarbyl or $(C_1-C_{20})$heterohydrocarbyl; n is 0, 1, or 2; m is 0, 1, 2, 3, or 4; b is 1, 2, 3, 4, 5, or 6; and the metal-ligand complex is overall charge neutral.

In a twenty-sixth aspect of the present disclosure, a process of preparing a heterogeneous procatalyst may include contacting components (1) and (2) without further chlorination. Component (1) may be a preformed heterogeneous procatalyst comprising a titanium species and a $MgCl_2$ support. Component (2) may be a metal-ligand complex having a structural formula $(L)_nM(Y)_m(XR^2)_b$, where M is a metal cation; each L is a neutral ligand or (=O); each Y is a halide or $(C_1-C_{20})$alkyl; each $XR^2$ is an anionic ligand in which X is a heteroatom or a heteroatom-containing functional group and $R^2$ is $(C_1-C_{20})$hydrocarbyl or $(C_1-C_{20})$heterohydrocarbyl; n is 0, 1, or 2; m is 0, 1, 2, 3, or 4; b is 1, 2, 3, 4, 5, or 6; and the metal-ligand complex is overall charge neutral.

A twenty-seventh aspect of the present disclosure may include either the twenty-fifth or twenty-sixth aspects, wherein the metal-ligand complex is in a hydrocarbon solution.

A twenty-eighth aspect of the present disclosure may include any of the twenty-fifth through twenty-second aspects, further comprising thermally treating the magnesium chloride at a temperature of greater than 100° C. for a treatment time of at least 30 minutes.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A heterogeneous procatalyst comprising:
   a titanium species, wherein the titanium species is $TiCl_{4-c}(OR^3)_c$, or $TiCl_{3-d}(OR^3)_d$, wherein $R^3$ is $(C_1-C_{20})$ hydrocarbyl, c is 0, 1, 2, 3, or 4, and d is 0, 1, 2, or 3;
   a preformed $MgCl_2$ support with a specific surface area of at least 100 m$^2$/g;
   a chlorinating agent having a structural formula $Al(Cl)_x(R^1)_{3-x}$ or $Si(Cl)_y(R^1)_{4-y}$, where:
   $R^1$ is a $(C_1-C_{30})$ hydrocarbyl;
   x is 1, 2, or 3; and
   y is 1, 2, 3, or 4; and
   a metal-ligand complex having a structural formula $(L)_nM(Y)_m(XR^2)_b$, where:
   M is a metal cation;
   each L is a neutral ligand or (=O);
   each Y is a halide or $(C_1-C_{20})$alkyl;
   each $XR^2$ is an anionic ligand in which X is a heteroatom or a heteroatom-containing functional group and $R^2$ is $(C_1-C_{20})$hydrocarbyl or $(C_1-C_{20})$heterohydrocarbyl;
   n is 0, 1, or 2;
   m is 0, 1, 2, 3, or 4;
   b is 1, 2, 3, 4, 5, or 6; and
   the metal-ligand complex is overall charge neutral;
   wherein the molar ratio of the total amount of chlorine in the chlorinating agent to the sum of the amounts of $OR^3$ and $XR^2$ in the heterogeneous procatalyst is from 0.33 to 1.45.

2. The heterogeneous procatalyst of claim 1, wherein the chlorinating agent is chosen from ethylaluminum dichloride, diethylaluminum chloride, ethylaluminum sesquichloride, isobutylaluminum dichloride, diisobutylaluminum chloride, and combinations thereof.

3. The heterogeneous procatalyst of claim 1, wherein the titanium species is chosen from $TiCl_4$, $TiCl_3$, $TiCl_2(OC_2H_5)_2$, $TiCl_2(O-i-C_3H_7)_2$, $TiCl_2(O-n-C_4H_9)_2$, $TiCl_2(O-i-C_4H_9)_2$, $TiCl(O-i-C_3H_7)_3$, $TiCl(O-n-C_4H_9)_3$, $TiCl(O-i-C_4H_9)_3$, $Ti(OC_2H_5)_4$, $Ti(O-i-C_3H_7)_4$, $Ti(O-n-C_4H_9)_4$, $Ti(O-i-C_4H_9)_4$, and $Ti(OCH_2CH(C_2H_5)(C_4H_9))_4$.

4. The heterogeneous procatalyst of claim 1, wherein the $MgCl_2$ support is a reaction product of an alkylmagnesium compound solution in a hydrocarbon diluent and a chloride source without separation of the hydrocarbon diluent.

5. The heterogeneous procatalyst of claim 1, wherein a molar ratio of the chlorinating agent to $MgCl_2$ in the heterogeneous procatalyst is from 0.05:1 to 2:1.

6. The heterogeneous procatalyst of claim 1, wherein a molar ratio of the titanium species to $MgCl_2$ in the heterogeneous procatalyst is from 0.005:1 to 0.25:1.

7. The heterogeneous procatalyst of claim 1, wherein the metal-ligand complex comprises at least one of vanadium (V) oxytripropoxide, vanadium(V) oxytributoxide, vanadium(V) oxytriisopropoxide, titanium(IV) isopropoxide, titanium(IV) ethoxide, or combinations thereof.

8. The heterogeneous procatalyst of claim 1, wherein the metal-ligand complex is a metal alkoxide having structural formula $M(OR^2)_e$, wherein e is 2, 3, 4, 5, or 6 or a metal oxyalkoxide having structural formula $M(=O)(OR^2)_f$, wherein f is 1, 2, 3, or 4.

9. The heterogeneous procatalyst of claim 1, wherein M is chosen from at least one of a vanadium cation, a titanium cation, a scandium cation, a zirconium cation, a niobium cation, a magnesium cation, or a calcium cation.

10. The heterogeneous procatalyst of claim 1, prepared by a process comprising thermally treating magnesium chloride at a temperature greater than 100° C. and a treatment time of at least 30 minutes to form the magnesium chloride component, then contacting the magnesium chloride component with the titanium species.

11. A catalyst system for olefin polymerization, the catalyst system comprising:
   the heterogeneous procatalyst of claim 1; and
   a cocatalyst comprising an organoaluminum compound.

12. The catalyst system of claim 11, wherein the cocatalyst is chosen from an alkyl aluminum, a haloalkylaluminum, an alkylaluminum halide, and combinations thereof.

13. A polymerization process comprising contacting ethylene and optionally one or more α-olefin comonomers with a catalyst system according to claim 11.

14. A polymerization process of claim 13, wherein the polymerization process is a solution polymerization process.

15. A process for preparing a heterogeneous procatalyst, the process comprising contacting a magnesium chloride component with a chlorinating agent, a titanium species, wherein the titanium species is $TiCl_{4-c}(OR^3)_c$ or $TiCl_{3-d}(OR^3)_d$, wherein $R^3$ is $(C_1-C_{20})$hydrocarbyl, c is 0, 1, 2, 3, or 4, and d is 0, 1, 2, or 3; and a metal-ligand complex, wherein:
- the magnesium chloride component is a preformed $MgCl_2$ support with specific surface area of at least 100 m²/g;
- the chlorinating agent has a structural formula $Al(Cl)_x(R^1)_{3-x}$ or $Si(Cl)_y(R^1)_{4-y}$, where:
  - $R^1$ is a $(C_1-C_{30})$ hydrocarbyl;
  - x is 1, 2, or 3; and
  - y is 1, 2, 3, or 4; and
- the metal-ligand complex has a structural formula $(L)_nM(Y)_m(XR^2)_b$, where:
  - M is a metal cation;
  - each L is a neutral ligand or (=O);
  - each Y is a halide or $(C_1-C_{20})$alkyl;
  - each $XR^2$ is an anionic ligand in which X is a heteroatom or a heteroatom-containing functional group and $R^2$ is $(C_1-C_{20})$hydrocarbyl or $(C_1-C_{20})$heterohydrocarbyl;
  - n is 0, 1, or 2;
  - m is 0, 1, 2, 3, or 4;
  - b is 1, 2, 3, 4, 5, or 6; and
  - the metal-ligand complex is overall charge neutral;
wherein the molar ratio of the total amount of chlorine in the chlorinating agent to the sum of the amounts of $OR^3$ and $XR^2$ in the heterogeneous procatalyst is from 0.33 to 1.45.

16. A process of preparing a heterogeneous procatalyst, the process comprising contacting components (1) and (2) without further chlorination, wherein:
- component (1) is a preformed heterogeneous procatalyst comprising:
  - a titanium species; and
  - a $MgCl_2$ support; and
- component (2) is a metal-ligand complex having a structural formula $(L)_nM(Y)_m(XR^2)_b$, where:
  - M is a metal cation;
  - each L is a neutral ligand or (=O);
  - each Y is a halide or $(C_1-C_{20})$alkyl;
  - each $XR^2$ is an anionic ligand in which X is a heteroatom or a heteroatom-containing functional group and $R^2$ is $(C_1-C_{20})$hydrocarbyl or $(C_1-C_{20})$heterohydrocarbyl;
  - n is 0, 1, or 2;
  - m is 0, 1, 2, 3, or 4;
  - b is 1, 2, 3, 4, 5, or 6; and
  - the metal-ligand complex is overall charge neutral;
wherein the metal-ligand complex comprises at least one of vanadium(V) oxytripropoxide, vanadium(V) oxytributoxide, vanadium(V) oxytriisopropoxide, titanium(IV) isopropoxide, or combinations thereof.

17. The process of claim 16, further comprising thermally treating the magnesium chloride at a temperature of greater than 100° C. for a treatment time of at least 30 minutes, wherein thermal treatment occurs before introduction of the titanium species.

* * * * *